US012456835B2

(12) United States Patent
Chen et al.

(10) Patent No.: US 12,456,835 B2
(45) **Date of Patent: *Oct. 28, 2025**

(54) CONNECTOR COMPONENT AND ELECTRONIC DEVICE

(71) Applicant: Huawei Digital Power Technologies Co., Ltd., Shenzhen (CN)

(72) Inventors: Jingxiao Chen, Shenzhen (CN); Peixing Chen, Dongguan (CN); Ruizhi Xue, Dongguan (CN); Wei Li, Dongguan (CN); Chenfei Quan, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 428 days.

This patent is subject to a terminal disclaimer.

(21) Appl. No.: 17/950,264

(22) Filed: Sep. 22, 2022

(65) Prior Publication Data

US 2023/0097389 A1 Mar. 30, 2023

(30) Foreign Application Priority Data

Sep. 29, 2021 (CN) .......................... 202111151739.9

(51) Int. Cl.
*H01R 13/26* (2006.01)
*H01R 13/187* (2006.01)

(52) U.S. Cl.
CPC ........... *H01R 13/26* (2013.01); *H01R 13/187* (2013.01)

(58) Field of Classification Search
CPC ...... H01R 13/26; H01R 13/187; H01R 13/53; H01R 13/639; H01R 13/71
USPC .................................................. 439/843, 188
See application file for complete search history.

(56) References Cited

U.S. PATENT DOCUMENTS 1,753,317 A * 4/1930 Rothen ................ H01R 13/635 439/180
1,966,950 A * 7/1934 Good ..................... H01R 13/26 439/269.2
2,490,580 A * 12/1949 Colla, Jr. ............. H01R 13/635 439/131

(Continued)

FOREIGN PATENT DOCUMENTS

CN 1808775 A 7/2006
CN 200979979 Y 11/2007

(Continued)

*Primary Examiner* — Harshad C Patel
(74) *Attorney, Agent, or Firm* — Maier & Maier, PLLC

(57) ABSTRACT

A connector component and an electronic device related to the field of connector technologies, to resolve a problem that the connector component does not support slow hot insertion or removal. The connector component includes a first connector and a second connector. The first connector includes a first housing and a first conductive terminal. The first conductive terminal is fastened to the first housing. The second connector includes a fastening component and a movable component. The fastening component includes a second conductive terminal. The movable component includes a sliding terminal and a stopper. The sliding terminal is connected to the second conductive terminal in a sliding manner. The stopper is fastened to the sliding terminal. The second connector further includes a force accumulator. The force accumulator is connected to the fastening component and the movable component.

19 Claims, 17 Drawing Sheets

(56) References Cited

U.S. PATENT DOCUMENTS 3,644,938 A * 2/1972 Slate .................... H01R 13/633
439/349
3,678,442 A * 7/1972 Cope ........................ B61G 5/10
439/187
4,659,160 A * 4/1987 Jonval .................. H01R 13/527
439/187
5,248,259 A * 9/1993 Naito ..................... H01R 13/71
439/700
6,089,887 A * 7/2000 Ozaki ................ H01R 33/0809
200/51.09
6,416,338 B1 * 7/2002 Berlovan ............... H01R 43/26
439/187
6,746,258 B2 * 6/2004 Kikuchi ............... H01R 13/635
217/1
7,044,759 B2 * 5/2006 Hughes ................... B60R 19/48
439/180
9,373,912 B1 * 6/2016 Juds ................... H01R 13/6666
2011/0111611 A1 * 5/2011 Zamora Gomez ... H01R 13/629
439/180
2022/0209463 A1 * 6/2022 Chen .................... H01R 13/639
2023/0094141 A1 * 3/2023 Chen ...................... H01R 13/71
439/188

FOREIGN PATENT DOCUMENTS

CN 112821138 A 5/2021
EP 1521381 B1 5/2006

* cited by examiner

CONNECTOR COMPONENT AND ELECTRONIC DEVICE

CROSS-REFERENCE TO RELATED APPLICATION

This application claims priority to Chinese Patent Application No. 202111151739.9, filed on Sep. 29, 2021, which is hereby incorporated by reference in its entirety.

TECHNICAL FIELD

The embodiments relate to the field of connector technologies, a connector component and an electronic device that can support slow hot insertion or removal.

BACKGROUND

A connector component is widely applied to a plurality of different types of circuits, to implement conduction or disconnection of currents in the circuits. For example, the connector component may include a male connector and a female connector. After the male connector is inserted to the female connector, a circuit may be connected, so that a current can flow in the circuit. After the male connector is removed from the female connector, the circuit may be disconnected, so that the current is blocked in the circuit. In some application scenarios, when a voltage in a circuit is high, an electric arc may be generated in a hot swapping (that is, insertion or removal with powered on) process of the male connector and the female connector. If the electric arc lasts for a long time, defects such as ablation may occur. Therefore, during operation, the male connector and the female connector need to be inserted or removed at a high speed (for example, more than 2 m/s), to reduce duration of the electric arc as much as possible. However, in an actual operation, the male connector or the female connector may not be quickly moved to implement quick insertion or removal. Therefore, a connector component, which can still reduce the duration of the electric arc when the male connector and the female connector are hot-inserted or removed at a low speed, is urgently needed at present.

SUMMARY

The embodiments may provide a connector component and an electronic device that can support slow hot insertion or removal.

In an aspect, the embodiments may provide a connector component, including a first connector and a second connector. The first connector includes a first housing and a first conductive terminal. The first conductive terminal is fastened to the first housing. The second connector includes a fastening component and a movable component. The fastening component includes a second conductive terminal. The movable component includes a sliding terminal and a stopper. The sliding terminal is connected to the second conductive terminal in a sliding manner. The stopper is fastened to the sliding terminal. The second connector further includes a force accumulator. The force accumulator is connected to the fastening component and the movable component. In a process in which the first connector is connected to the second connector, when the stopper is fastened relative to the first housing, the fastening component and the movable component slide relative to each other, so that the force accumulator is deformed due to an accumulated force; and when the stopper is unfastened relative to the first housing, the force accumulator is restored from the deformation, to drive the sliding terminal to be connected to the first conductive terminal.

Alternatively, in a process in which the first connector is separated from the second connector, when the stopper is fastened relative to the first housing, the fastening component and the movable component slide relative to each other, so that the force accumulator is deformed due to an accumulated force; and when the stopper is unfastened relative to the first housing, the force accumulator is restored from the deformation, to drive the sliding terminal to be separated from the first conductive terminal.

In the connector component, in the process in which the first connector is connected to or separated from the second connector, when the stopper is fastened relative to the first housing, and relative displacement is generated between the fastening component and the movable component due to an external force acting on the fastening component, the force accumulator may be deformed due to the accumulated force. When the stopper is unfastened relative to the first housing, the force accumulator may be restored from the deformation, to drive the sliding terminal to be connected to or separated from the first conductive terminal.

Alternatively, it may be understood that, when the external force (for example, a hand) acts on the second housing and the second connector moves toward a first direction to connect the first connector, after the stopper is fastened relative to the first housing, the movable component stops moving. When the second housing continuously moves toward the first direction, and relative displacement is generated between the fastening component and the movable component, the force accumulator may be deformed due to the accumulated force. After the stopper is unfastened relative to the first housing, the movable component may move toward the first direction. In addition, under an acting force of restoring the force accumulator from the deformation, the force accumulator may drive the movable component to quickly move toward the first direction, so that the sliding terminal may be quickly connected to the first conductive terminal, to reduce duration of an electric arc. Correspondingly, when the external force (for example, the hand) acts on the second housing and the second connector moves toward a second direction (a direction opposite to the first direction) to separate from the first connector, after the stopper is fastened relative to the first housing, the movable component stops moving. In this case, the first conductive terminal is connected with the sliding terminal. When the fastening component continuously moves toward the second direction, and the relative displacement is generated between the fastening component and the movable component, the force accumulator may be deformed due to the accumulated force. After the stopper is unfastened relative to the first housing, the movable component may move toward the second direction. In addition, under the acting force of restoring the force accumulator from the deformation, the force accumulator may drive the movable component to quickly move toward the second direction, so that the sliding terminal may be quickly separated from the first conductive terminal, to reduce the duration of the electric arc.

In a process in which the second connector moves along a first direction and is connected to the second connector, and the fastening component moves to a position, the stopper is fastened relative to the first housing. When the fastening component continuously moves along the first direction, the force accumulator is deformed due to the accumulated force, and the fastening component acts on the stopper, so that the stopper is unfastened relative to the first housing. When the force accumulator is restored from the deformation, the sliding terminal is connected to the first conductive terminal.

Alternatively, it may be understood that, in this embodiment, when the first connector is connected to the second connector, accumulation and release of the force accumulator may be implemented in the entire connection process. Therefore, the sliding terminal may be quickly and reliably connected to the first conductive terminal. This does not depend on a movement speed of the hand in this process, which facilitates an actual operation.

In addition, in a process in which the second connector is separated from the second connector along the second direction, the stopper is fastened relative to the first housing. When the fastening component continuously moves along the second direction, and the force accumulator is deformed due to the accumulated force, the fastening component acts on the stopper, so that the stopper is unfastened relative to the first housing. When the force accumulator is restored from the deformation, the sliding terminal is separated from the first conductive terminal.

Alternatively, it may be understood that, in this embodiment, when the first connector is separated from the second connector, the accumulation and release of the force accumulator may be implemented in the entire separation process. Therefore, the sliding terminal may be quickly and reliably separated from the first conductive terminal. This does not depend on the movement speed of the hand in this process, which facilitates the operation.

One end of the sliding terminal may have a sliding slot facing the second direction, and one end of the second conductive terminal facing the first direction is inserted into the sliding slot in the sliding manner, so that the sliding terminal is connected to the second conductive terminal in the sliding manner, and the sliding terminal can slide relative to the second conductive terminal along the first direction or the second direction.

To implement a reliable electrical connection between the sliding terminal and the second conductive terminal, in an implementation, the second connector may further include an elastic conductive member. The elastic conductive member is fastened to the sliding terminal, and elastically abuts against the second conductive terminal. When the sliding terminal slides relative to the second conductive terminal, the elastic conductive member may synchronously slide when the sliding terminal slides, and may elastically abut against the second conductive terminal, to ensure reliability of the electrical connection between the sliding terminal and the second conductive terminal.

It may be understood that, in another implementation, the elastic conductive member may not be disposed between the sliding terminal and the second conductive terminal. Alternatively, when being disposed, the elastic conductive member may be fastened to the second conductive terminal and may elastically abut against the sliding terminal.

In some implementations, the second connector may further include a base and the second housing. The base is fastened to the second housing, and the second conductive terminal is fastened to the second housing. The base may have a sliding cylinder disposed in parallel to the first direction, and the sliding terminal is disposed in the sliding cylinder in the sliding manner. When the sliding terminal slides along the first direction or the second direction, and the sliding terminal is fitted with the sliding cylinder in the sliding manner, stability of the sliding terminal during sliding may be effectively improved.

In addition, there may be various structural forms and disposing manners of the stopper.

For example, the stopper may include a bracket, a first fastener, and a first spring. The bracket is fastened to the sliding terminal, and the first fastener is rotationally connected to the bracket. The first spring is connected to the first fastener and the bracket. The first housing has a first abutting surface facing the second direction. The first spring is configured to rotate the first fastener to a position at which the first fastener abuts against the first abutting surface. Alternatively, the position may be understood as a first lock-up position. When the fastening component continuously moves along the first direction and the first fastener is located in the first lock-up position, the stopper may abut against the first abutting surface, to prevent the stopper from continuously moving along the first direction. When the second housing continuously moves along the first direction, the fastening component may slide relative to the movable component, so that the force accumulator may be deformed due to the accumulated force.

Under an action of the external force, the first fastener may further be rotated to a position at which the first fastener does not abut against the first abutting surface. Alternatively, the position may be understood as a first unlocking position. In a direction that is parallel to the first direction, a projection of the first fastener on the first housing does not intersect the first abutting surface. When the first fastener is rotated to the first unlocking position, because the first fastener is not affected by an abutting action of the first abutting surface, the movable component may be driven, through an elastic force of the force accumulator, to slide along the first direction, so that the sliding terminal may be quickly connected to the first conductive terminal.

In an implementation, to enable that the first lock-up position of the first fastener is changed to the first unlocking position, a corresponding first trigger part may be disposed in the fastening component. For example, in an implementation, the base has the first trigger part. When the fastening component moves to a second connection position, the first trigger part acts on the first fastener until that the first fastener is rotated to the first unlocking position, so that the first fastener is unfastened relative to the first abutting surface.

The force accumulator may include a first elastic component. The first elastic component may be disposed in the sliding slot of the sliding terminal. One end of the first elastic component is connected to one end of the sliding slot, and the other end is connected to the second conductive terminal. When the second conductive terminal moves relative to the sliding terminal along the first direction, the first elastic component may be compressed and deformed.

In addition, the stopper may further include a second fastener and a second spring. The second fastener is connected to the bracket in the sliding manner. The second spring is connected to the second fastener and the bracket and is configured to enable that the second fastener slides to a second lock-up position. The first housing has a second abutting surface facing the first direction. The second lock-up position is a position at which the second fastener abuts against the second abutting surface.

Under the action of the external force, the second fastener may further slide to a position at which the second fastener does not abut against the second abutting surface. Alternatively, the position may be understood as a second unlocking position. In the direction that is parallel to the first direction, a projection of the second fastener on the first housing does not intersect the second abutting surface. When the second fastener slides to the second unlocking position, because the second fastener is not affected by an abutting action of the second abutting surface, the movable component may be driven, through the elastic force of the force accumulator, to slide along the second direction, so that the sliding terminal may be quickly separated from the first conductive terminal.

In an implementation, to enable the second fastener to change from the second lock-up position to the second unlocking position, a corresponding second trigger part may be disposed in the fastening component. For example, in an implementation, the second housing has the second trigger part. When the fastening component moves to a second separation position, the second trigger part acts on the second fastener until that the second fastener is rotated to the second unlocking position, so that the second fastener is unfastened relative to the second abutting surface.

The force accumulator may further include a second elastic component. One end of the second elastic component is connected to the bracket, and the other end is connected to the base. When the base moves relative to the bracket along the second direction, the second elastic component is stretched and deformed.

In conclusion, in an implementation, the force accumulator may include the first elastic component and the second elastic component. The first elastic component is configured to drive the sliding terminal to be quickly connected to the first conductive terminal. The second elastic component is configured to drive the sliding terminal to be quickly separated from the first conductive terminal. Therefore, flexibility of selecting the first elastic component and the second elastic component may be effectively improved. It may be understood that in another implementation, a single force accumulator (for example, the first elastic component or the second elastic component) may be used to drive the sliding terminal to be quickly connected to the first conductive terminal and drive the sliding terminal to be quickly separated from the first conductive terminal. A quantity and a disposing manner of components included in the force accumulator are not limited.

In an implementation, the first housing may have various shapes.

For example, the first housing may have a first groove opened toward the second direction. One end of the first conductive terminal is located in the first groove, to well protect the first conductive terminal.

In addition, when the electric arc is generated when the first conductive terminal is connected to or separated from the sliding terminal, the electric arc may appear in the first groove. Therefore, to avoid ablation of the first housing, a ceramic layer or another high temperature resistance material may be disposed on a side wall of the first groove.

In addition, in an implementation, the second housing may have various shapes.

For example, the second housing may have a second groove opened toward the first direction. One end of the second conductive terminal is located in the second groove, to well protect the second conductive terminal.

In another aspect, the embodiments may further provide an electronic device. The electronic device includes a first power-consuming device, a second power-consuming device, and any of the connector components. A first connector is connected to the first power-consuming device, and a second connector is connected to the second power-consuming device. One end of a first conductive terminal may be electrically connected to a conductive structure of the first power-consuming device, and one end of a second conductive terminal may be electrically connected to a conductive structure of the second power-consuming device. When the first connector is connected to the second connector, the first power-consuming device may be connected to the second power-consuming device. When the first connector is separated from the second connector, the first power-consuming device may be disconnected from the second power-consuming device.

The first power-consuming device may be a solid-state transformer and the second power-consuming device may be a power module. Types of the first power-consuming device and the second power-consuming device and an application scenario of the connector component are not limited.

DETAILED DESCRIPTION OF THE EMBODIMENTS

To make objectives, solutions, and advantages of the embodiments clearer, the following further describes the embodiments in detail with reference to the accompanying drawings.

For ease of understanding of a connector component provided in the embodiments, the following first describes an application scenario of the connector component.

Figure 1:
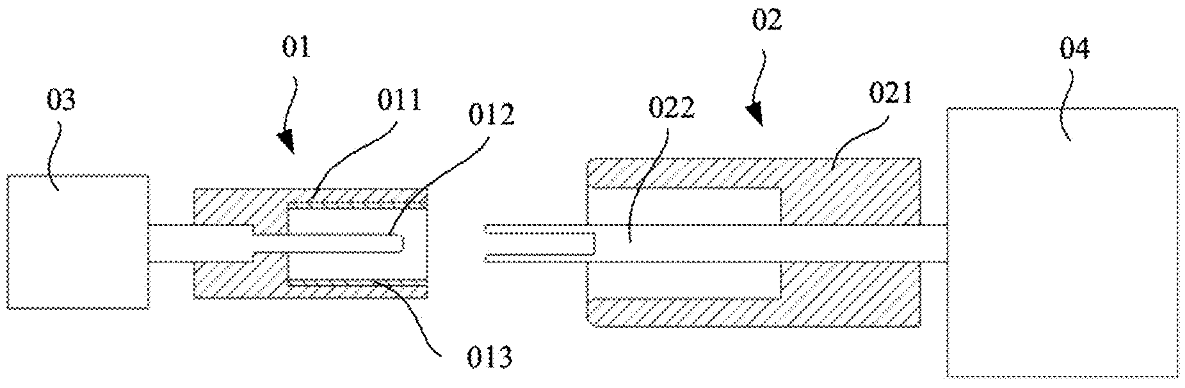
FIG. 1 is a schematic diagram of an application scenario of a connector component according to an embodiment.

FIG. 1 shows an application scenario of a connector component. The connector component may include a first connector 01 and a second connector 02. The first connector 01 includes an insulation housing 011 and a first conductive terminal 012. The first conductive terminal 012 is fastened to the insulation housing 011. The second connector 02 includes an insulation housing 021 and a second conductive terminal 022. The second conductive terminal 022 is fastened to the insulation housing 021. In an actual application, a left end of the first conductive terminal 012 may be electrically connected to an electronic device 03. Correspondingly, a right end of the second conductive terminal 022 may be electrically connected to an electronic device 04. When the first connector 01 is connected to the second connector 02, a right end of the first conductive terminal 012 is connected to a left end of the second conductive terminal 022, a circuit may be connected, to electrically connect the electronic device 03 to the electronic device 04. When the first connector 01 is separated from the second connector 02, the right end of the first conductive terminal 012 is separated from the left end of the second conductive terminal 022, so that the circuit may be disconnected, to disconnect a path between the electronic device 03 and the electronic device 04.

In some application scenarios, the connector component needs to have functions of hot insertion or removal. The hot insertion or removal means that when the first connector 01 is connected to or separated from the second connector 02, the first conductive terminal 012 or the second conductive terminal 022 is energized. When a voltage of the first conductive terminal 012 or the second conductive terminal 022 is high, an electric arc is inevitably generated when the first conductive terminal 012 is separated from or connected to the second conductive terminal 022. When a distance between the first conductive terminal 012 and the second conductive terminal 022 is within a range, the electric arc may be generated between the first conductive terminal 012 and the second conductive terminal 022. After the first conductive terminal 012 is connected to the second conductive terminal 022, or the distance between the first conductive terminal 012 and the second conductive terminal 022 is large enough, the electric arc may disappear. Burning of the electric arc may ablate the insulation housing or other parts around the connector component, or even cause undesirable situations such as explosion. Therefore, in some current connector components, a ceramic layer 013 or another high temperature resistant material may be disposed on an inner wall of the insulation housing 011 or a burning area of the electric arc. However, in an actual application, when duration of the electric arc lasts for a long time, undesirable situations such as ablation or electric arcing still occur. Currently, an effective solution is to reduce the duration of the electric arc as much as possible. However, the first connector 01 needs to be hot-swapped with the second connector 02 at a high moving speed (for example, more than 2 m/s). The first conductive terminal 012 may need to be quickly connected to the second conductive terminal 022, or the distance between the first conductive terminal 012 and the second conductive terminal 022 may needs to be larger. In an actual operation, it may be difficult to manually move the first connector 01 or the second connector 02. Therefore, there are limitations. In addition, in some application scenarios, the first connector 01 and the second connector 02 are usually fastened to the electronic device. Therefore, when the first connector 01 needs to be connected to or separated from the second connector 02, the entire electronic device needs to be moved. As a result, it is more difficult to implement quick movement.

Therefore, the embodiments may provide the connector component that can support slow hot insertion or removal and can effectively reduce the duration of the electric arc in a slow insertion or removal process.

To make objectives, solutions, and advantages clearer, the following further describes the embodiments in detail with reference to the accompanying drawings.

Terms are used merely for the purpose of describing the embodiments but are not intended to limit. Terms "one", "a", and "this" of singular forms are also intended to include a form like "one or more", unless otherwise specified in the context clearly. It should be further understood that, in the following embodiments, "at least one" means one, two, or more.

Reference to "one embodiment" or the like means that one or more embodiments may include a particular feature, structure, or characteristic described in combination with the embodiment. Therefore statements, such as "in an embodiment", "in some embodiments", and "in other embodiments", that appear at different places do not necessarily mean referring to a same embodiment, instead, the statements mean referring to "one or more but not all of the embodiments", unless otherwise emphasized in other ways. Terms "include", "have", and variants of the terms all mean "include but are not limited to", unless otherwise emphasized in other ways.

Figure 2:
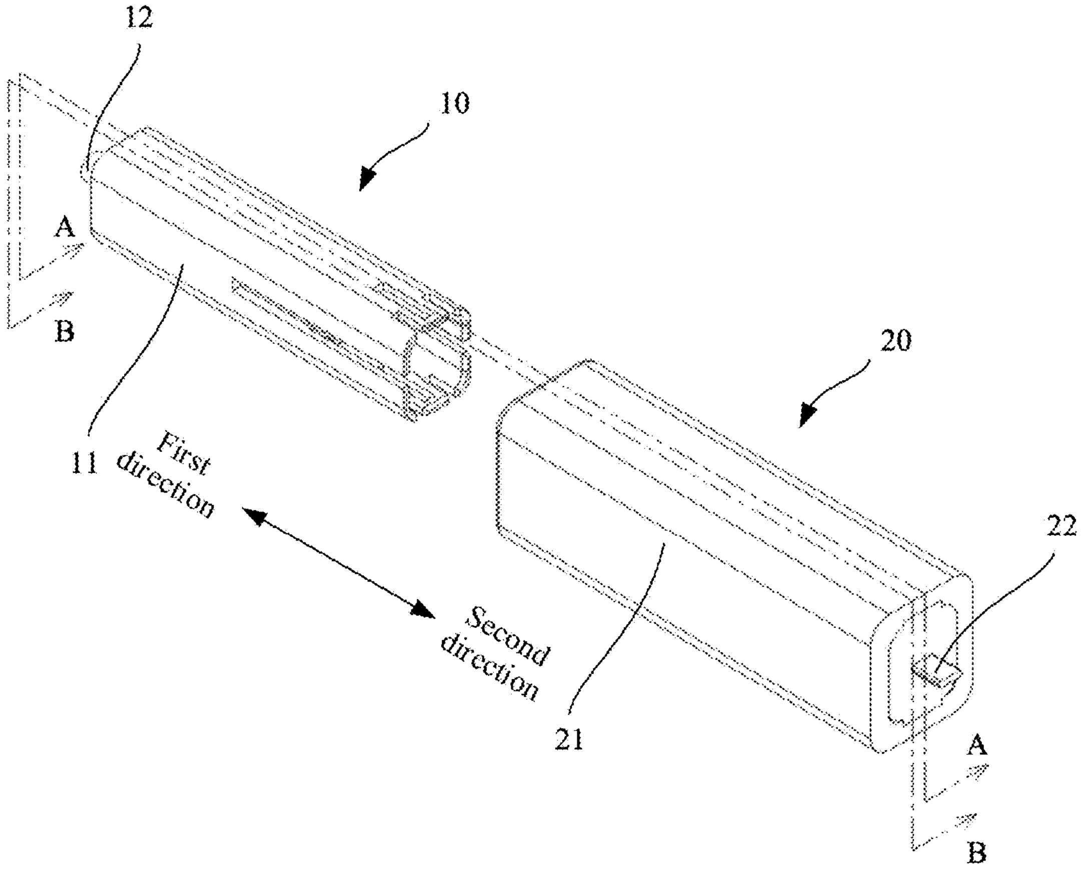
FIG. 2 is a schematic diagram of a three-dimensional structure of a connector component according to an embodiment.

As shown in FIG. 2, in an embodiment, the connector component includes a first connector 10 and a second connector 20. In addition, for ease of describing a movement status of each part when the first connector 10 is connected to and separated from the second connector 20, the following embodiments use an example in which the first connector 10 is fastened and the second connector 20 moves.

Figure 3:
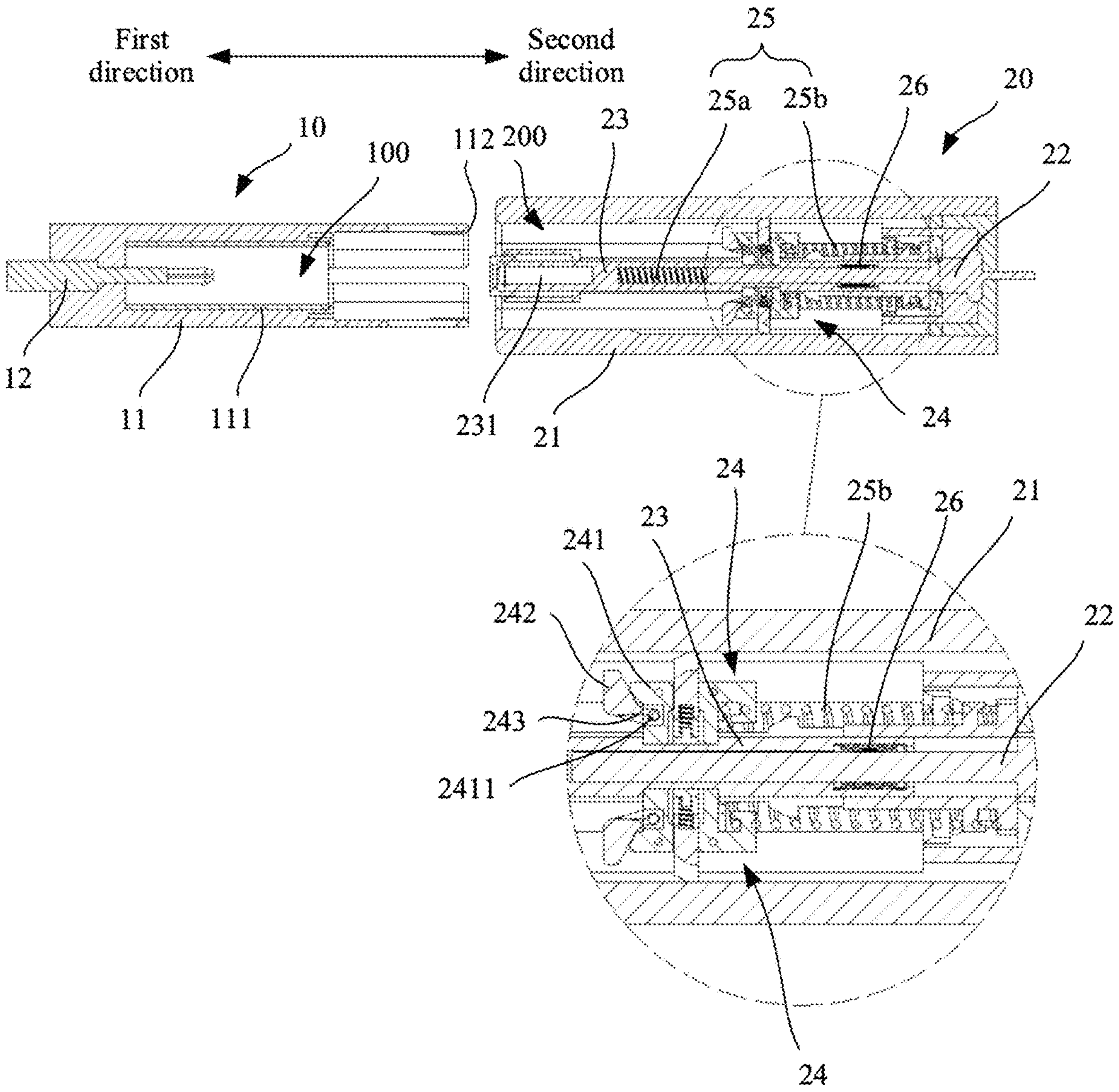
FIG. 3 is a schematic diagram of a cross-sectional structure of A-A in FIG. 2.

As shown in FIG. 2 and FIG. 3, the first connector 10 includes a first housing 11 and a first conductive terminal 12. The first conductive terminal 12 is fastened to the first housing 11. The second connector 20 includes a fastening component (not shown in the figure) and a movable component (not shown in the figure). The fastening component includes a second housing 21 and a second conductive terminal 22. The second conductive terminal 22 is fastened to the second housing 21. The movable component includes a sliding terminal 23 and a stopper 24. The sliding terminal 23 is connected to the second conductive terminal 22 in a sliding manner, and the sliding terminal 23 is electrically connected to the second conductive terminal 22. The stopper 24 is fastened to the sliding terminal 23, and the two can synchronously move. The second connector 20 further includes a force accumulator 25. The force accumulator 25 is connected to the fastening component and the movable component. When the fastening component and the movable component move relative to each other under an external force, the force accumulator 25 may be deformed when the fastening component and the movable component extrude or stretch the force accumulator. When there is no constraint between the fastening component and the movable component, the force accumulator 25 is restored to a state before the force accumulator 25 is extruded or stretched, to drive the movable component to move relative to the fastening component. That there is no constraint between the fastening component and the movable component means that there is no limitation that the fastening component is fastened relative to the movable component, and the fastening component and the movable component may move relative to each other under an action of the external force.

In this embodiment, in a process in which the first connector 10 is connected to the second connector 20, when the stopper 24 is fastened relative to the first housing 11, relative displacement is generated between the fastening component and the movable component due to an external force acting on the stopper, and the fastening component and the movable component approach to each other face to face, the force accumulator 25 may be deformed when the fastening component and the movable component extrude the force accumulator 25. When the stopper 24 is unfastened relative to the first housing 11, the force accumulator 25 is restored to a state before the force accumulator 25 is extruded, to drive the sliding terminal 23 to be connected to the first conductive terminal 12, and effectively reduce duration of an electric arc.

Alternatively, it may be understood that, when the external force (for example, a hand) acts on the second housing 21 and the second connector 20 moves toward a first direction relative to the first housing 11 to connect the first connector 10, after the stopper 24 is fastened relative to the first housing 11, the movable component stops moving. When the second housing 21 continuously moves toward the first direction, and the relative displacement is generated between the fastening component and the movable component, the force accumulator 25 (for example, a first elastic component 25*a*) may be deformed due to an accumulated force. After the stopper 24 is unfastened relative to the first housing 11, the movable component may move toward the first direction. In addition, under an acting force of restoring the force accumulator 25 (for example, the first elastic component 25*a*) from the deformation, the force accumulator 25 (for example, the first elastic component 25*a*) may drive the movable component to quickly move toward the first direction, so that the sliding terminal 23 may be connected to the first conductive terminal 12 at a high speed, to effectively reduce the duration of the electric arc.

In addition, in a process in which the first connector 10 is separated from the second connector 20, when the stopper 24 is fastened relative to the first housing 11, the relative displacement is generated between the fastening component and the movable component due to the external force acting on the stopper, and the fastening component and the movable component are separated from each other, the force accumulator 25 may be deformed when the fastening component and the movable component stretch the force accumulator 25. When the stopper 24 is unfastened relative to the first housing 11, the force accumulator 25 is restored to a state before the force accumulator 25 is stretched, to drive the sliding terminal 23 to be separated from the first conductive terminal 12, and effectively reduce the duration of the electric arc.

Alternatively, it may be understood that, when the external force (for example, the hand) acts on the second housing 21 and the second connector 20 moves toward a second direction relative to the first housing 11 to separate from the first connector 10, after the stopper 24 is fastened relative to the first housing 11, the movable component stops moving. In this case, the first conductive terminal 12 is connected with the sliding terminal 23. When the fastening component continuously moves toward the second direction, and the relative displacement is generated between the fastening component and the movable component, the force accumulator 25 (for example, a second elastic component 25*b*) may be deformed due to the accumulated force. After the stopper 24 is unfastened relative to the first housing 11, the movable component may move toward the second direction. In addition, under the acting force of restoring the force accumulator 25 (for example, the second elastic component 25*b*) from the deformation, the force accumulator 25 (for example, the second elastic component 25*b*) may drive the movable component to quickly move toward the second direction, so that the sliding terminal 23 may be separated from the first conductive terminal 12 at the high speed, to effectively reduce the duration of the electric arc.

To facilitate understanding of the embodiments, the following first separately describes structures of the first connector 10 and the second connector 20.

For the first connector 10, as shown in FIG. 3, in an embodiment, one end (a right end in the figure) of the first housing 11 has a first groove 100 opened toward the second direction. One end (a right end in the figure) of the first conductive terminal 12 is located in the first groove 100 and is configured to connect the sliding terminal 23 of the second connector 20. The other end (a left end in the figure) of the first conductive terminal 12 protrudes out of one end (a left end in the figure) of the first housing 11 facing the first direction and is configured to connect a cable or a conductive structure of an electronic device.

A main function of the first housing 11 is to fasten and protect the first conductive terminal 12. In an application, the first housing 11 may be made of a material with good insulation, such as plastic. In a plane perpendicular to the second direction, an outline of the first housing 11 may be a rectangle, a circle, an ellipse, or another polygonal structure. A shape of the first housing 11 is not limited.

In addition, in a process in which the first conductive terminal 12 is connected to or separated from the sliding terminal 23, the electric arc may appear in the first groove 100. Therefore, in an embodiment, a ceramic layer 111 is disposed on a side wall of the first groove 100. The ceramic layer 111 has good insulation performance and high temperature resistance performance. Therefore, ablation of the first housing 11 caused by the electric arc can be effectively prevented, to improve safety of the first housing 11. It may be understood that in another implementation, another material having good insulation and high temperature resistance performance may be further disposed on an inner wall of the first groove 100. This is not limited.

As a carrier of a current, in an actual application, the first conductive terminal 12 may be made of a material with good conductivity, such as copper. A material of the first conductive terminal 12 is not limited. In addition, in this embodiment, the first conductive terminal 12 has a rod structure, and a length direction of the first conductive terminal 12 is parallel to the first direction. When the first conductive terminal 12 is connected to the sliding terminal 23, one end of the first conductive terminal 12 facing the sliding terminal 23 may be inserted into a groove 231 of the sliding terminal 23, to reliably connect the first conductive terminal 12 to the sliding terminal 23.

It may be understood that, in another implementation, the end of the first conductive terminal 12 facing the sliding terminal 23 may also be disposed as a groove structure, and the end of the sliding terminal 23 facing the first conductive terminal 12 has a solid rod structure. This is not limited.

For the second connector 20, as shown in FIG. 3, in an embodiment, one end (for example, a left end in the figure) of the second housing 21 has a second groove 200 opened toward the first direction. In other words, an opening direction of the first groove 100 of the first connector 10 is opposite to an opening direction of the second groove 200 of the second connector 20 in a process of connecting the first connector 10 to the second connector 20. One end (a left end in the figure) of the second conductive terminal 22 is located in the second groove 200. The other end (a right end in the figure) of the second conductive terminal 22 protrudes out of one end (a right end in the figure) of the second housing 21 facing the second direction and is configured to connect the cable or the conductive structure of the electronic device.

A main function of the second housing 21 is to fasten and protect the second conductive terminal 22. The second housing 21 may be made of a material with good insulation, such as plastic. In a plane perpendicular to the second direction, an outline of the second housing 21 may be a rectangle, a circle, an ellipse, or another polygonal structure. A shape of the second housing 21 is not limited.

As carriers of currents, in an actual application, the second conductive terminal 22 and the sliding terminal 23 may be made of the material with good conductivity, such as copper. Materials of the second conductive terminal 22 and the sliding terminal 23 are not limited.

In addition, in this embodiment, both the second conductive terminal 22 and the sliding terminal 23 have a rod structure, and length directions of the second conductive terminal 22 and the sliding terminal 23 are parallel to the first direction.

To connect the second conductive terminal 22 to the sliding terminal 23 in the sliding manner, in this embodiment, one end of the sliding terminal 23 facing the second direction has a sliding slot (not shown in the figure), and one end (the left end in the figure) of the second conductive terminal 22 facing the first direction is inserted into the sliding slot, to connect the sliding terminal 23 to the second conductive terminal 22 in the sliding manner.

In addition, in an actual application, there is a current flowing between the second conductive terminal 22 and the sliding terminal 23. Therefore, to improve reliability of an electrical connection between the second conductive terminal 22 and the sliding terminal 23, in an embodiment, the second connector 20 further includes an elastic conductive member 26. The elastic conductive member 26 may include a crown spring. The crown spring has a tubular structure, and a tubular diameter is gradually decreased from two ends to a middle part. The crown spring is fastened in the sliding slot, and the crown spring elastically abuts against a periphery of the second conductive terminal 22. When the sliding terminal 23 slides relative to the second conductive terminal 22, the crown spring may slide with the sliding terminal 23 and may elastically abut against the second conductive terminal 22, to ensure the reliability of the electrical connection between the sliding terminal 23 and the second conductive terminal 22.

It may be understood that, in another implementation, the elastic conductive member 26 may also be fastened to the second conductive terminal 22 and may elastically abut against the sliding terminal 23. In addition, the elastic conductive member 26 may be another type of conductive part that can implement the reliability of the electrical connection between the sliding terminal 23 and the second conductive terminal 22 and that does not affect relative movement of the sliding terminal 23 and the second conductive terminal 22. A type and a disposing manner of the elastic conductive member 26 are not limited.

In an application, the stopper 24 may have various structures.

Figure 4:
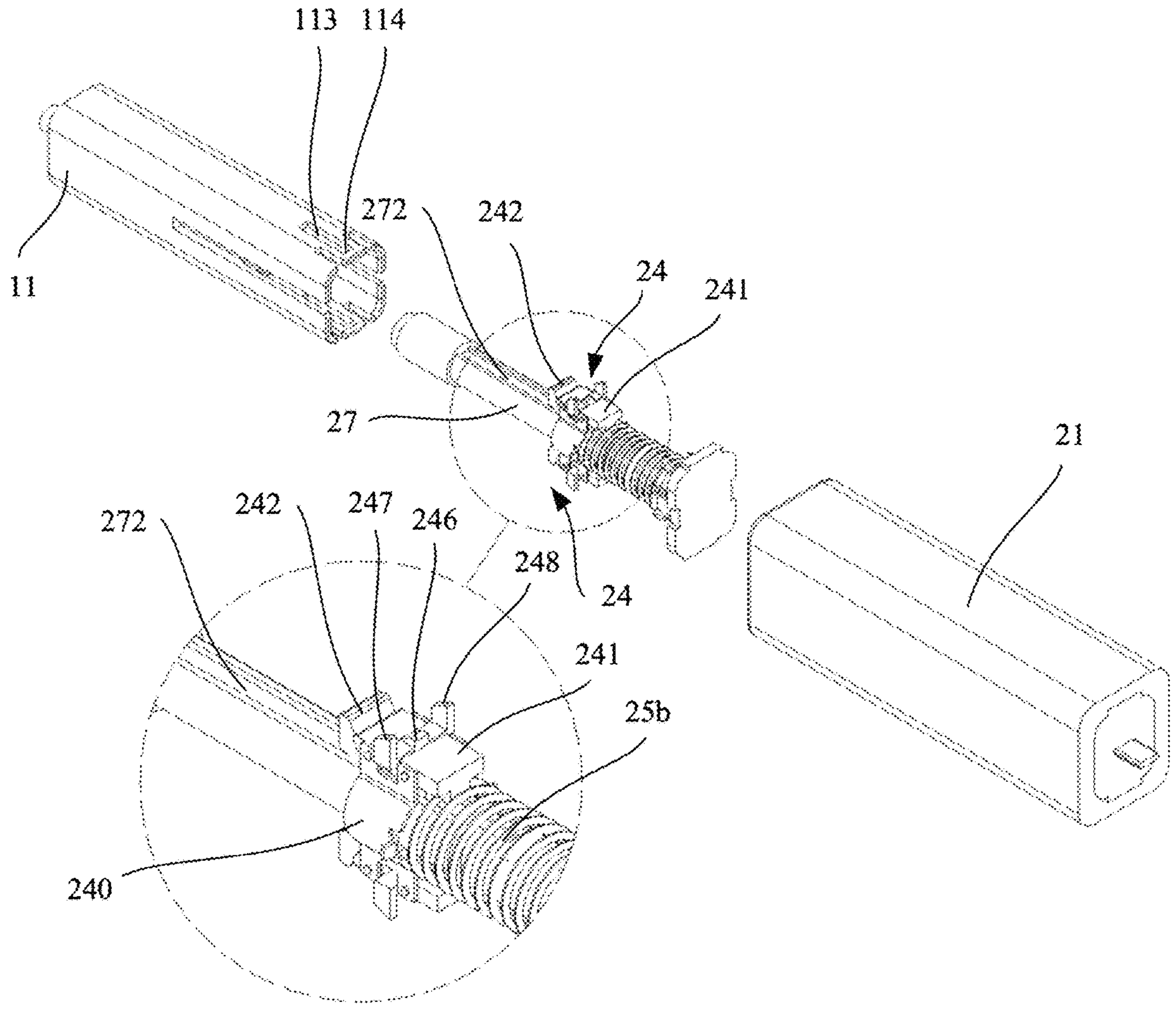
FIG. 4 is a schematic diagram of a breakdown structure of a connector component according to an embodiment.

For example, as shown in FIG. 3 and FIG. 4, in an embodiment, two stoppers 24 are symmetrically disposed on an upper side and a lower side of the sliding terminal 23. The two stoppers 24 have approximately the same structure and are connected by using a connection plate 240. The following uses the stopper 24 disposed on the upper side of the sliding terminal 23 as an example. The stopper 24 may include a bracket 241, a first fastener 242, and a first spring 243. The bracket 241 is fastened to the sliding terminal 23, and the first fastener 242 is rotationally connected to the bracket 241. The first spring 243 is connected to the first fastener 242 and the bracket 241 and is configured to rotate the first fastener 242 to a first lock-up position shown in FIG. 3, so that the first fastener 242 may abut against a first abutting surface 112.

There may be an installation position for fastening the bracket 241 on an outer circumferential surface of the sliding terminal 23. The bracket 241 may be fastened to the sliding terminal 23 in a manner of welding, screwing, or bonding. It may be understood that a connection manner between the bracket 241 and the sliding terminal 23 is not limited.

As shown in FIG. 3, the first fastener 242 is mounted on the bracket 241 by using a rotating shaft 2411, so that the first fastener 242 may rotate around the rotating shaft 2411. The first spring 243 is connected to the first fastener 242 and the bracket 241. Under an elastic force of the first spring 243, the first fastener 242 may be maintained on the first lock-up position shown in the figure. When the first fastener 242 is rotated in an anticlockwise direction under an acting force of another component, the first spring 243 is stressed and elastically deformed. After the acting force of the another component disappears, the first spring 243 is restored from the deformation, so that the first fastener 242 may be rotated along a clockwise direction to the first lock-up position.

As shown in FIG. 3, when the first fastener 242 is located in the first lock-up position, in a process in which the second connector 20 moves along the first direction, the first fastener 242 abuts against the first abutting surface 112 of the first housing 11, to prevent the stopper 24 and the sliding terminal 23 from moving leftward, and prevent the sliding terminal 23 from approaching the first conductive terminal 12.

Figure 6:
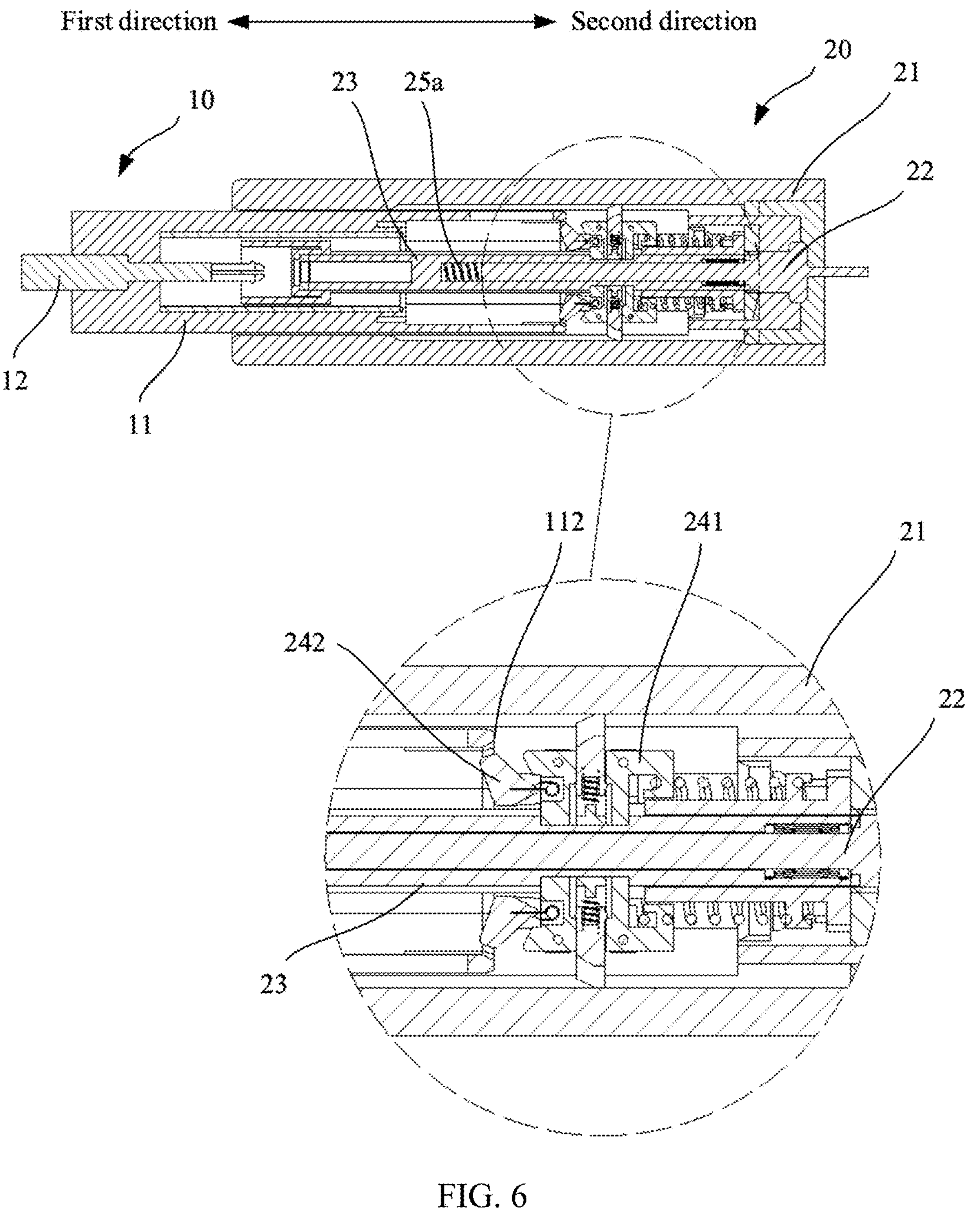
FIG. 6 is a schematic diagram of a cross-sectional structure of a connector component in a connection state according to an embodiment.

As shown in FIG. 6, when the first fastener 242 is located in a first unlocking position, the first fastener 242 does not abut against the first abutting surface 112 of the first housing 11. Alternatively, it may be understood that in a direction that is parallel to the first direction, a projection of the first fastener 242 on the first housing 11 does not intersect the first abutting surface 112, so that the stopper 24 and the sliding terminal 23 move toward the first direction.

In this embodiment, to enable that the first fastener 242 can be rotated to the first unlocking position, the second connector 20 further includes a base 27.

Figure 5:
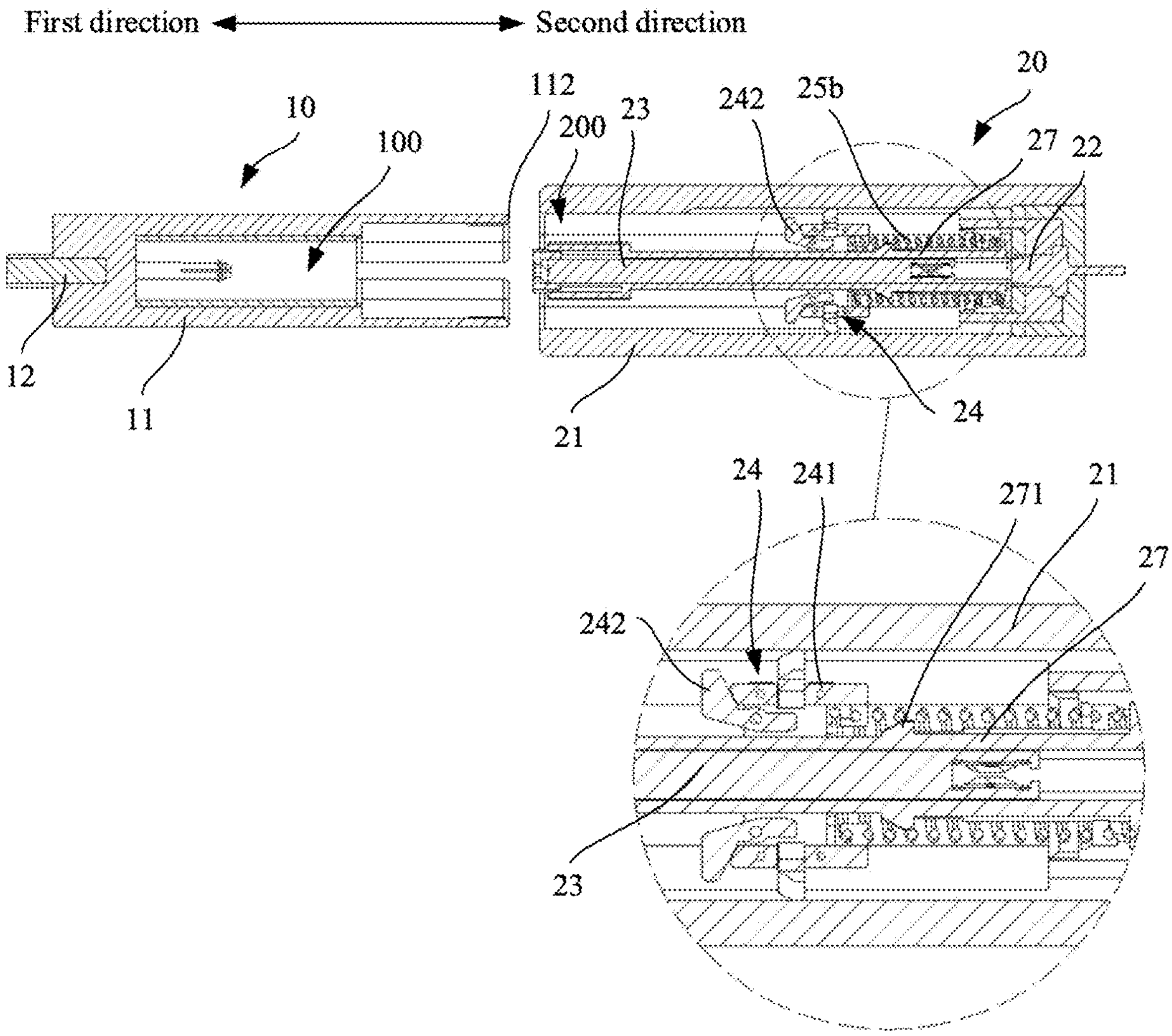
FIG. 5 is a schematic diagram of a cross-sectional structure of B-B in FIG. 2.

As shown in FIG. 4 and FIG. 5, the base 27 is fastened to the second housing 21 and may move with the second housing 21. In this embodiment, the base 27 has a tubular structure, and one end (a right end in the figure) of the base 27 facing the second direction is fastened to the second housing 21. A circle of flanges is disposed on an outer circumferential surface of the base 27, and the flanges may form a first trigger part 271 that is configured to rotate the first fastener 242 to the first unlocking position.

As shown in FIG. 5, when the base 27 moves toward the first direction, a left side (the left side in the figure) of the flange facing the first direction abuts against the first fastener 242, and the first fastener 242 is rotated along the anticlockwise direction to the first unlocking position.

In this embodiment, a cross section of the flange is in a right-angle triangle shape, and an oblique surface abuts against the first fastener 242, to push the first fastener 242 to rotate along the anticlockwise direction.

It may be understood that, in another implementation, the cross section of the flange may also be in a trapezoid shape or another shape that can drive the first fastener 242 to rotate along the anticlockwise direction. The shape of the flange is not limited.

Alternatively, in another implementation, a corresponding structure may also be disposed in the second housing 21 to trigger the first fastener 242, so that the first fastener 242 is unfastened relative to the first housing 11, and the stopper 24 and the sliding terminal 23 may slide along the first direction.

In addition, in this embodiment, stability of the sliding terminal 23 during sliding may be further improved by using the base 27.

The base 27 may have a sliding cylinder (not shown in the figure) that is disposed in parallel to the first direction. The sliding terminal 23 may be disposed in the sliding cylinder in the sliding manner. When the sliding terminal 23 is fitted with the base 27 in the sliding manner, the stability of the sliding terminal 23 during sliding may be effectively ensured.

In addition, the base 27 can further effectively prevent the stopper 24 and the sliding terminal 23 from rotating.

As shown in FIG. 4, the base 27 has a sliding slot 272 that is disposed along the first direction. After the bracket 241 is fastened to the sliding terminal 23, a part of the bracket 241 passes through the sliding slot 272 and is fitted with the sliding slot 272 in the sliding manner. When the bracket 241 and the sliding terminal 23 slide relative to the base 27 along the first direction, under a limiting effect of the sliding slot 272, the bracket 241 and the sliding terminal 23 can be effectively prevented from rotating around the axis of the sliding terminal 23, to effectively improve stability of the sliding terminal 23 and the stopper 24 during sliding.

In an actual application, a type and a disposing position of the force accumulator may be diversified.

For example, as shown in FIG. 6, in an embodiment, the force accumulator includes the first elastic component **25*a*. The first elastic component 25*a* may be a spiral spring. The spiral spring is disposed in the sliding slot (not shown in the figure) of the sliding terminal 23, one end (a left end in the figure) is connected to one end (a left end in the figure) of the sliding slot facing the first direction, and the other end is connected to the second conductive terminal 22. Under the action of the external force, when the second conductive terminal 22 moves relative to the sliding terminal 23 along the first direction, the first elastic component 25*a* is compressed and deformed. When there is no other constraint between the second conductive terminal 22 and the sliding terminal 23, the first elastic component 25*a* is restored from the deformation, so that the sliding terminal 23 slides relative to the second conductive terminal 22** along the first direction.

In this embodiment, the first elastic component **25*a* may use a spiral spring with a good compression capability. When the first elastic component 25*a* is compressed under the action of the external force, the external force may be effectively absorbed and converted into an elastic force of the first elastic component 25*a*. Therefore, the first elastic component 25*a* may be effectively restored to a state before the first elastic component 25*a* is compressed, so that the elastic force can be effectively released to effectively push the sliding terminal 23** to move.

In addition, the first elastic component **25*a* is disposed in the sliding slot, so that stability of the first elastic component 25*a* during deformation may be further improved. Because the first elastic component 25*a* is constrained in the sliding slot, when being extruded, the first elastic component 25*a* may not move in a direction that is perpendicular to the first direction, and may be effectively deformed in a direction that is parallel to the first direction, so that the stability of the first elastic component 25*a* may be effectively improved during deformation. Correspondingly, when the first elastic component 25*a* is restored, under the elastic force of the first elastic component 25*a*, to a state before the first elastic component 25*a* is deformed, because being constrained in the sliding slot, the first elastic component 25*a*** may not move in the direction that is perpendicular to the first direction, and may be effectively deformed in the direction that is parallel to the first direction.

It may be understood that, in another implementation, the first elastic component **25*a* may also be another elastic component that can absorb and release a force. In addition, the first elastic component 25*a* may also be disposed at another position. In conclusion, under the action of the external force, when the second conductive terminal 22 moves relative to the sliding terminal 23 along the first direction, the first elastic component 25*a* may be deformed due to the accumulated force. When there is no constraint between the sliding terminal 23 (or the movable component) and the second conductive terminal 22 (or the fastening component), the first elastic component 25*a* can drive, through an elastic deformation of the first elastic component 25*a*, the sliding terminal 23** to move along the first direction.

To facilitate understanding of the solutions, the following describes different states of the first connector 10 and the second connector 20 when the first connector 10 and the second connector 20 are connected.

As shown in FIG. 3, in this case, the first connector 10 and the second connector 20 are completely separated.

Under the elastic force of the first spring 243, the first fastener 242 is located in the first lock-up position shown in FIG. 3. The first elastic component **25*a* may be in a natural state, the first elastic component 25*a* is not extruded or stretched by the sliding terminal 23 and the second conductive terminal 22**.

Figure 7:
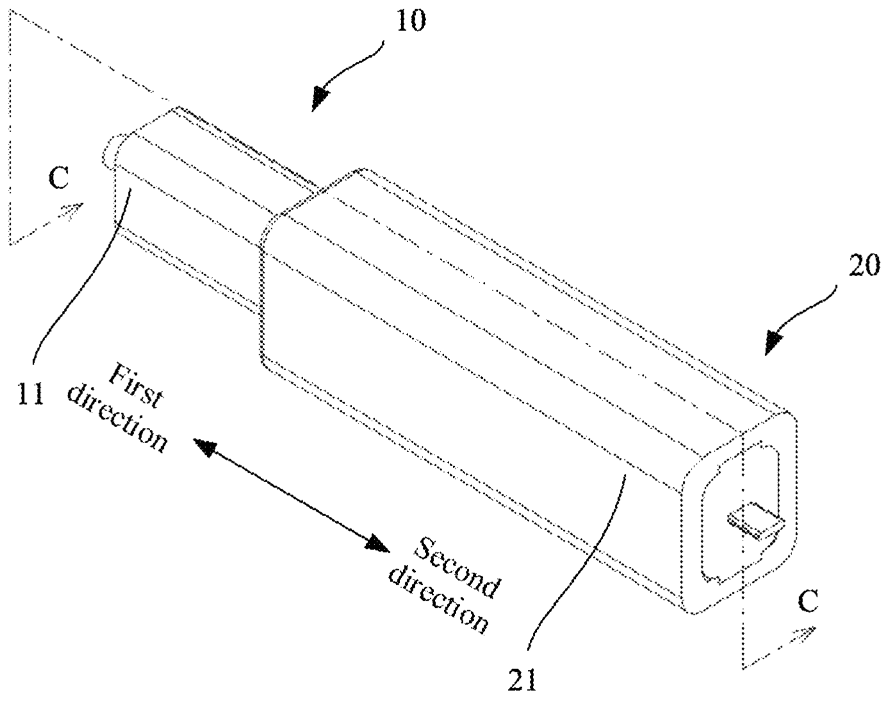
FIG. 7 is a schematic diagram of a three-dimensional structure of a connector component in another connection state according to an embodiment.
Figure 8:
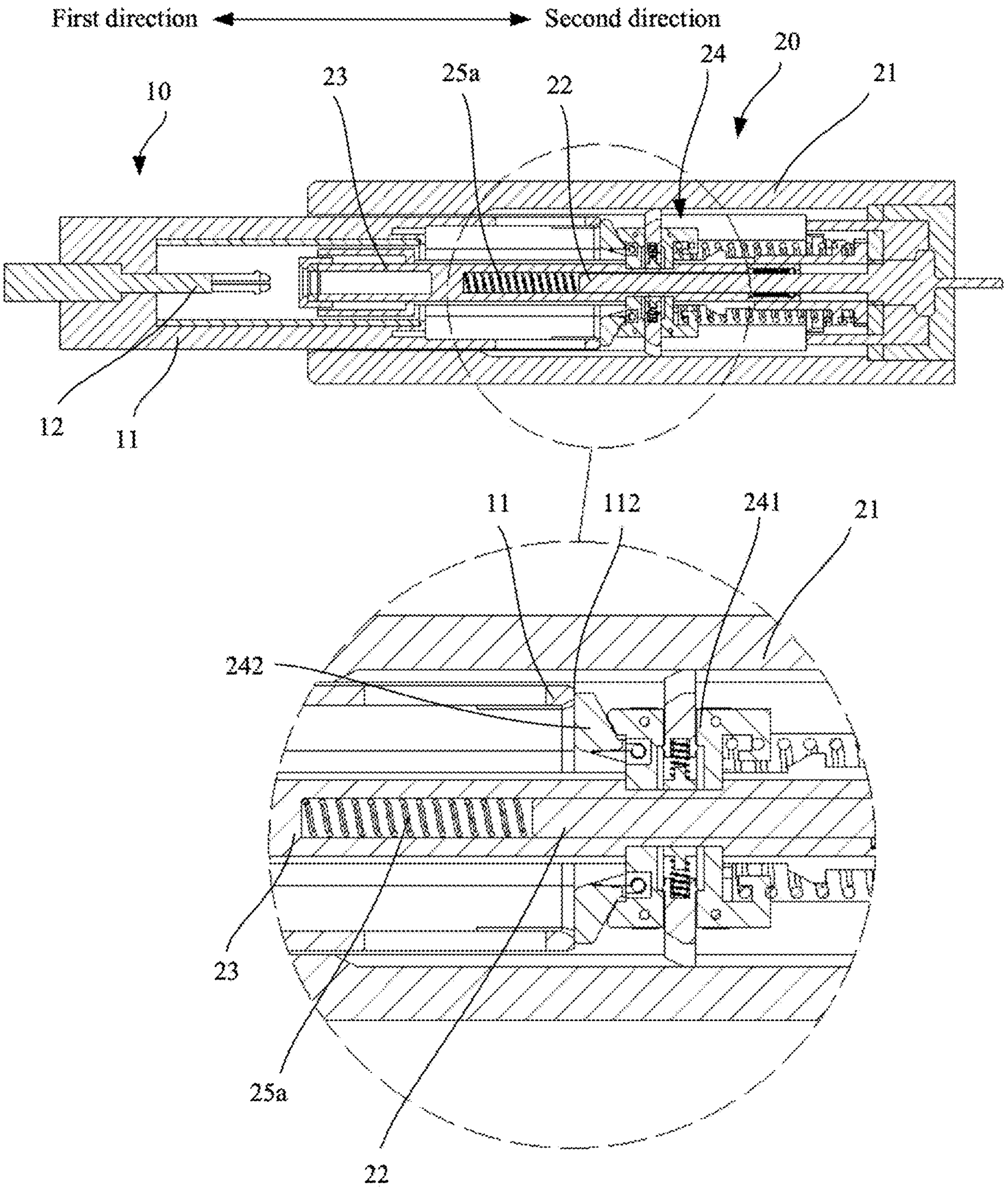
FIG. 8 is a schematic diagram of a cross-sectional structure of C-C in FIG. 7.

As shown in FIG. 7 and FIG. 8, in this case, the fastening component moves to a first connection position. Under the action of the external force (for example, holding the second housing 21 by the hand), the second connector 20 gradually moves along the first direction until it to be connected to the first connector 10, the first fastener 242 in the first lock-up position abuts against the first abutting surface 112 of the first housing 11, to prevent the movable component from continuously moving along the first direction. It may be understood that the movable component may include the sliding terminal 23 and the stopper 24.

Figure 9:
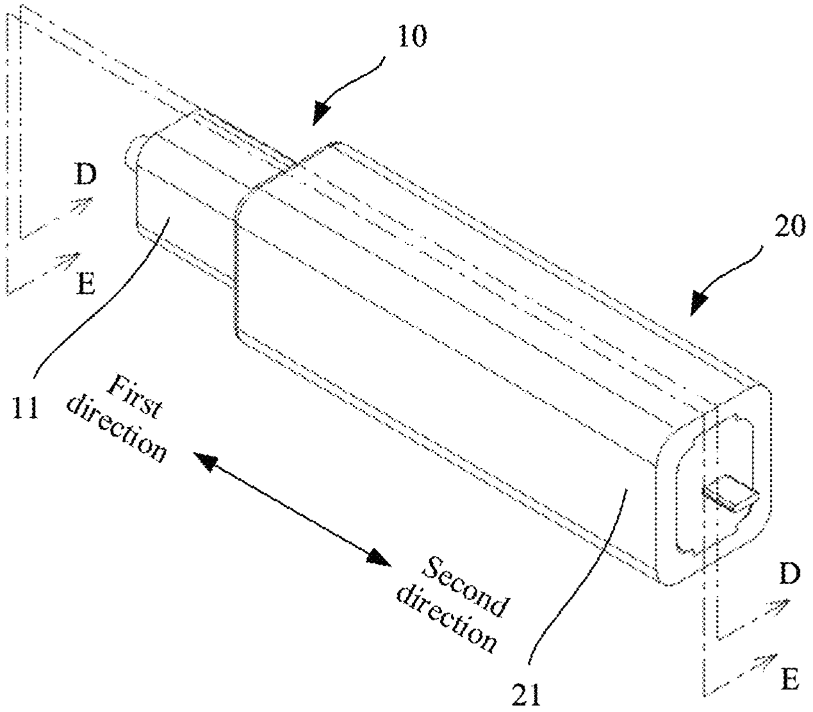
FIG. 9 is a schematic diagram of a three-dimensional structure of a connector component in another connection state according to an embodiment.
Figure 10:
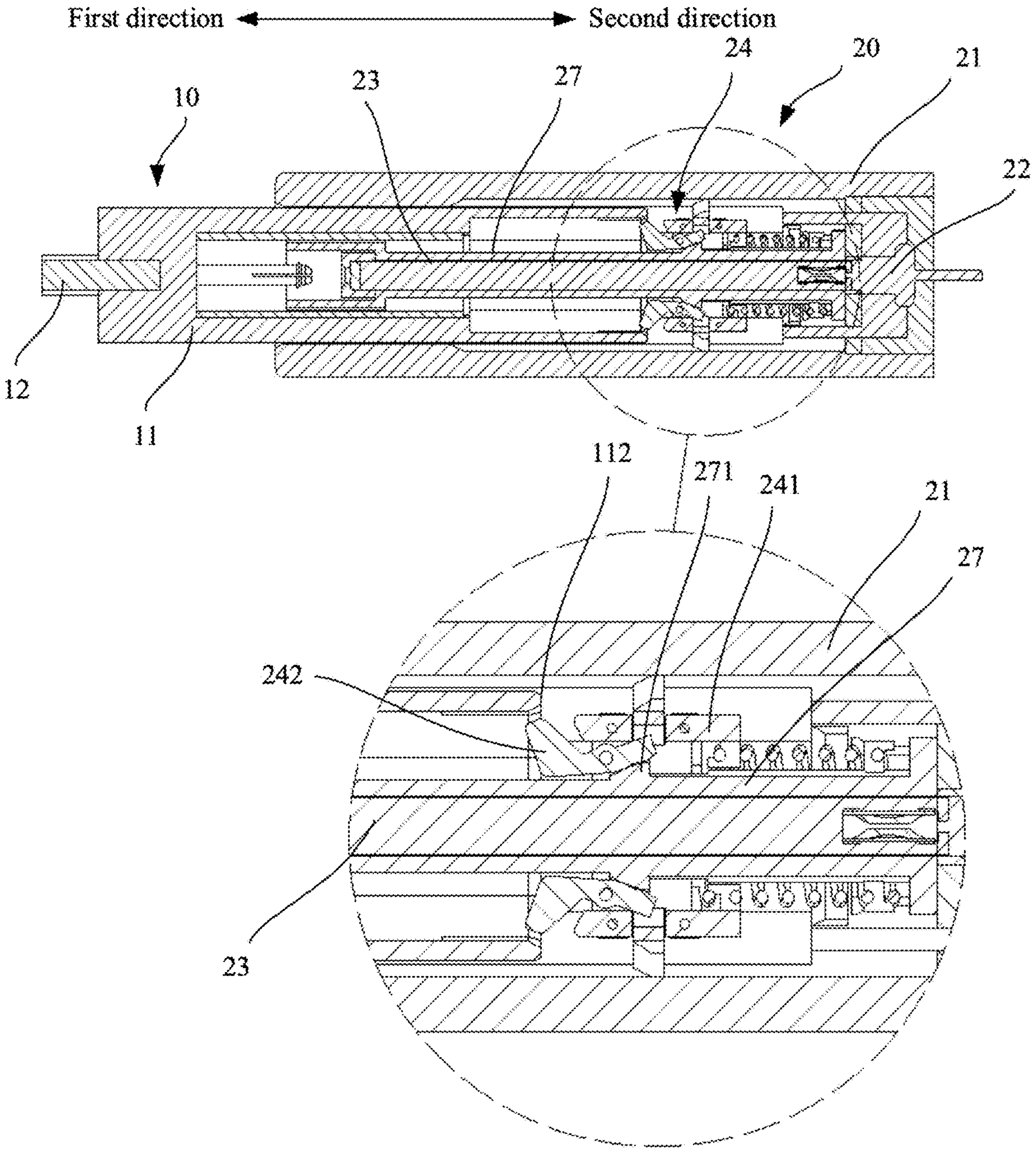
FIG. 10 is a schematic diagram of a cross-sectional structure of E-E in FIG. 9.
Figure 11:
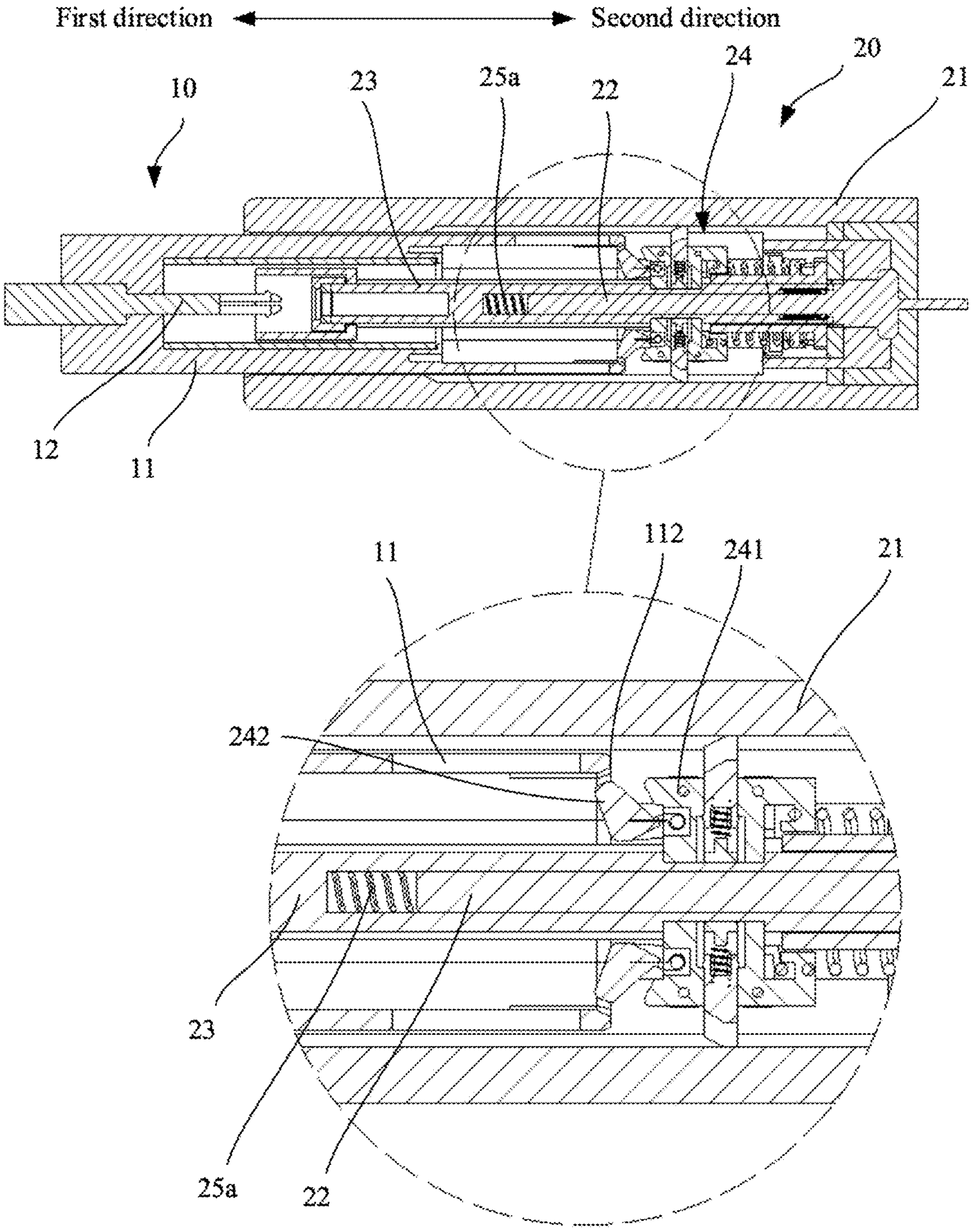
FIG. 11 is a schematic diagram of a cross-sectional structure of D-D in FIG. 9.

As shown in FIG. 9 to FIG. 11, in this case, the fastening component moves to a second connection position.

As shown in FIG. 8, the second connector 20 continuously moves along the first direction. Because the first fastener 242 is abutted by the first abutting surface 112, the sliding terminal 23 does not continuously move along the first direction. Under the action of the external force (for example, holding the second housing 21 by the hand), the second housing 21, the second conductive terminal 22, and the base 27 continuously move along the first direction. In this process, because the second conductive terminal 22 displaces relative to the sliding terminal 23 along the first direction, the first elastic component 25*a* is extruded and elastically deformed.

As shown in FIG. 10, when the first trigger part 271 of the base 27 acts on the first fastener 242, the first fastener 242 is rotated along the anticlockwise direction, so that the first fastener 242 is separated from the first abutting surface 112 of the first housing 11, to drive the movable component to move along the first direction.

Figure 12:
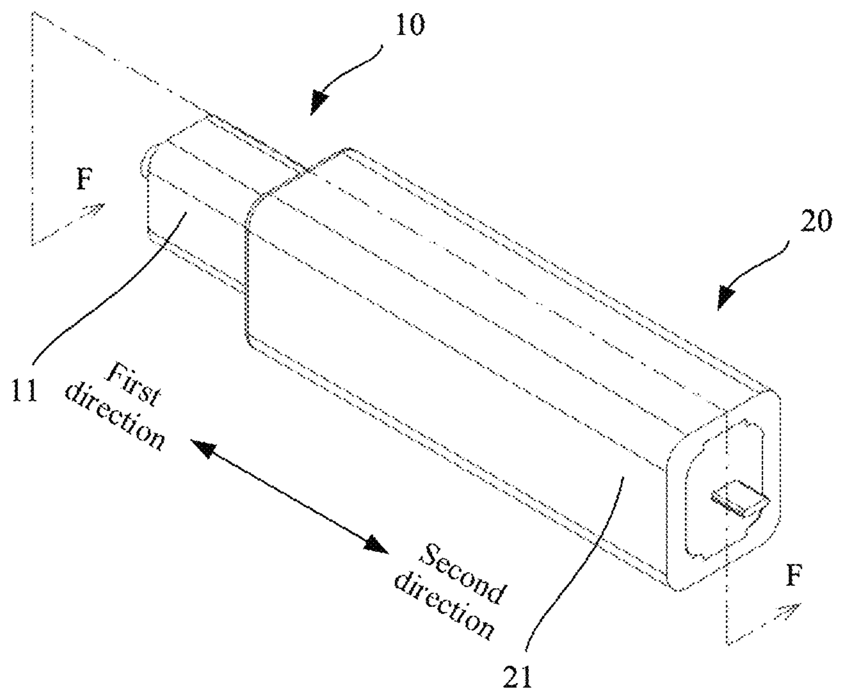
FIG. 12 is a schematic diagram of a three-dimensional structure of a connector component in another connection state according to an embodiment.
Figure 13:
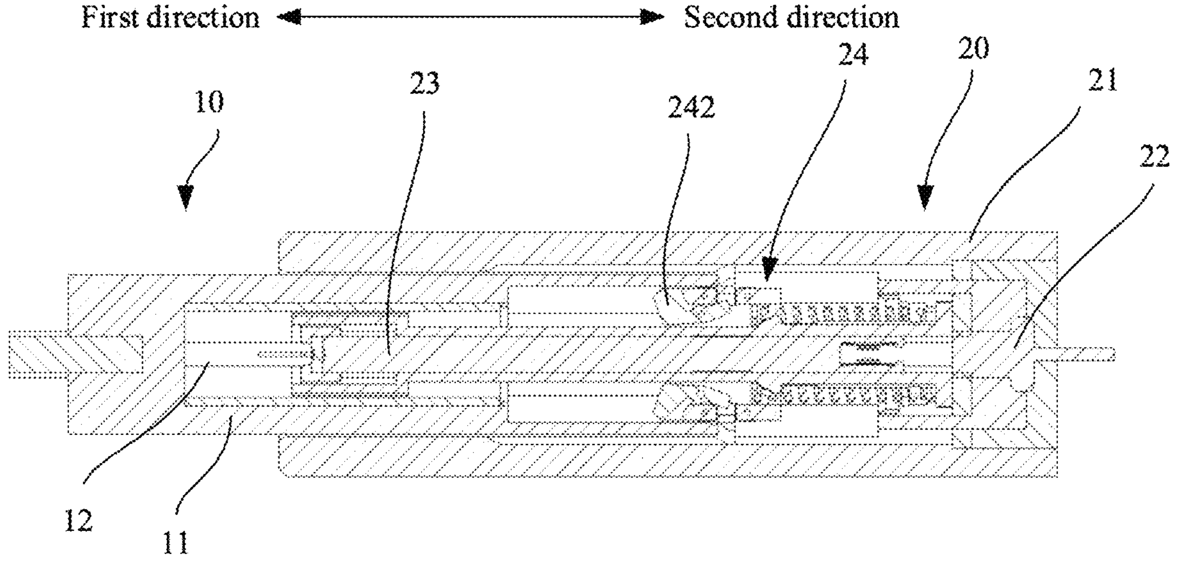
FIG. 13 is a schematic diagram of a cross-sectional structure of F-F in FIG. 12.

As shown in FIG. 12 and FIG. 13, in this case, the force accumulator (not shown in the figure) drives the movable component to move to a third connection position.

As shown in FIG. 11 and FIG. 13, under the elastic force of the first elastic component 25*a*, the movable component quickly moves along the first direction, so that the sliding terminal 23 is connected to the first conductive terminal 12 at a high speed, to reduce burning duration of the electric arc as much as possible.

It may be understood that, when the first trigger part 271 starts to abut against the first fastener 242, a distance between the sliding terminal 23 and the first conductive terminal 12 is long enough. Therefore, no electric arc is generated between the sliding terminal 23 and the first conductive terminal 12. Under an acting force of the first elastic component 25*a*, in a process in which the sliding terminal 23 quickly moves along the first direction, when the sliding terminal 23 is close enough to the first conductive terminal 12 and is not in contact with the first conductive terminal 12, the electric arc is inevitably generated. After the sliding terminal 23 is connected to the first conductive terminal 12, the electric arc disappears.

In some implementations, to implement a better connection between the first conductive terminal 12 and the sliding terminal 23, after the sliding terminal 23 is connected to the first conductive terminal 12 under an action of the first elastic component 25*a*, the second housing 21 may be further held by the hand to continuously move along the first direction, to ensure that a length of the first conductive terminal 12 that is inserted into the groove is long enough.

In addition, in this embodiment, when the first connector 10 is removed from the second connector 20, the sliding terminal 23 may also be quickly separated from the first conductive terminal 12.

Figure 14:
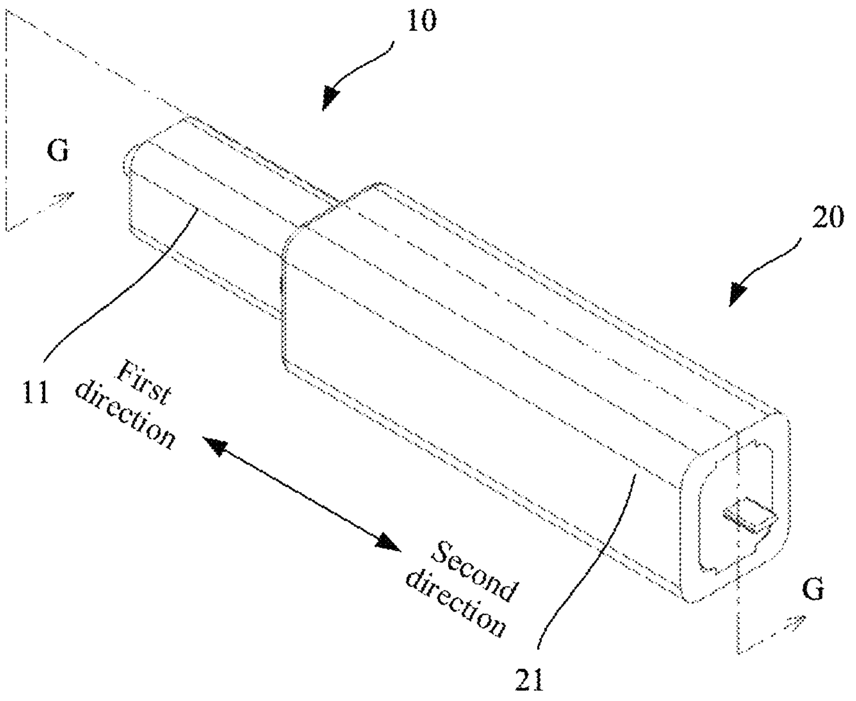
FIG. 14 is a schematic diagram of a three-dimensional structure of a connector component in another separation state according to an embodiment.
Figure 15:
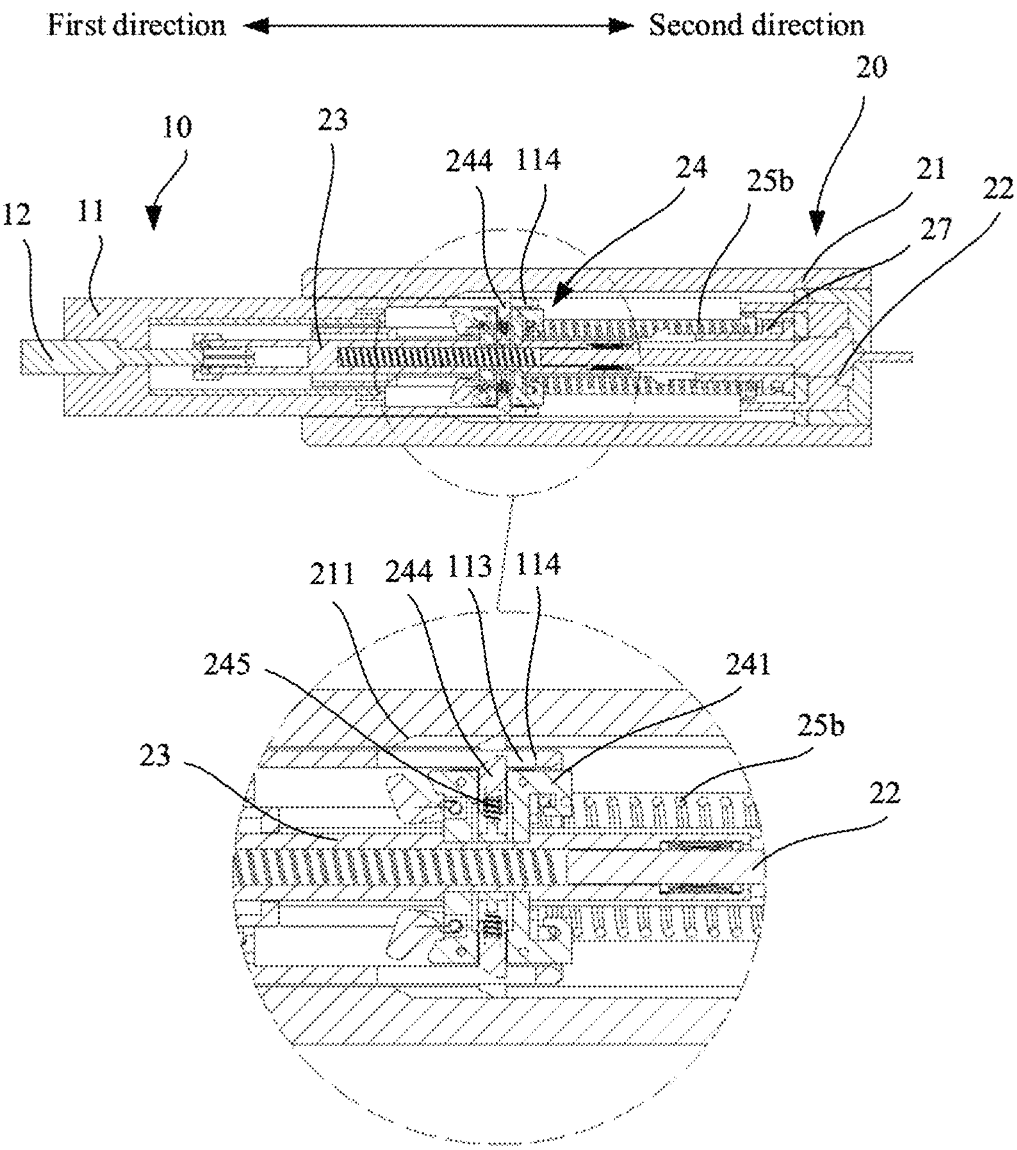
FIG. 15 is a schematic diagram of a cross-sectional structure of G-G in FIG. 14.

As shown in FIG. 14 and FIG. 15, in the embodiments, the stopper 24 further includes a second fastener 244 and a second spring 245. The second fastener 244 is connected to the bracket 241 in the sliding manner. The bracket 241 may have a sliding hole (not shown in the figure), the second fastener 244 may be disposed in the sliding hole, and may slide up and down along the sliding hole. The second spring 245 is located in the sliding hole, one end (an upper end in the figure) of the second spring 245 is connected to the second fastener 244, and the other end (a lower end in the figure) of the second spring 245 is connected to the bracket 241. In a natural state, the second spring 245 is configured to maintain the second fastener 244 in a second lock-up position shown in the figure.

Figure 16:
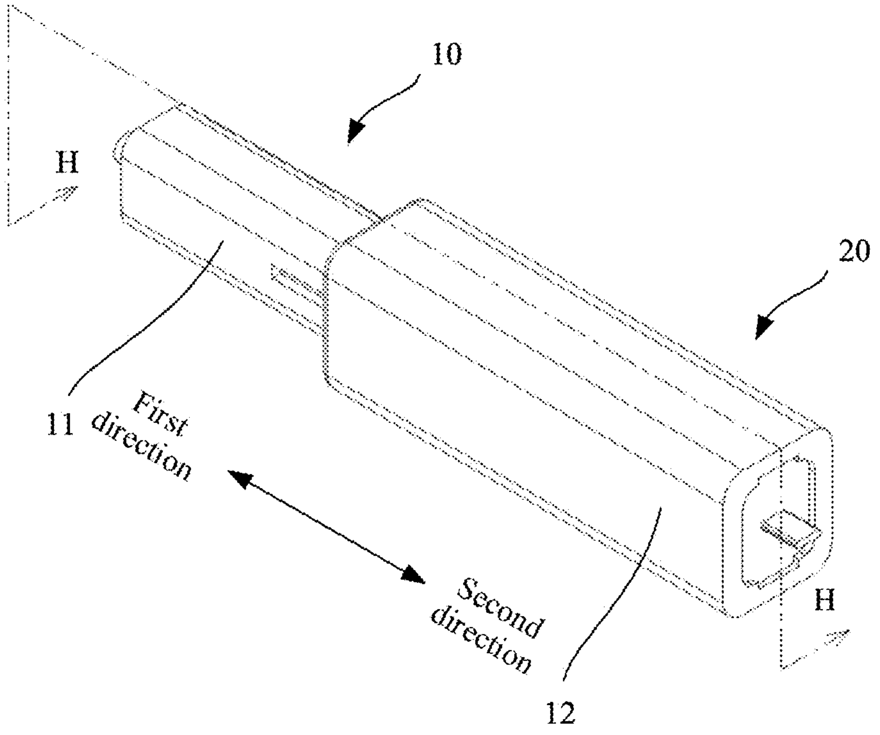
FIG. 16 is a schematic diagram of a three-dimensional structure of a connector component in another separation state according to an embodiment.
Figure 17:
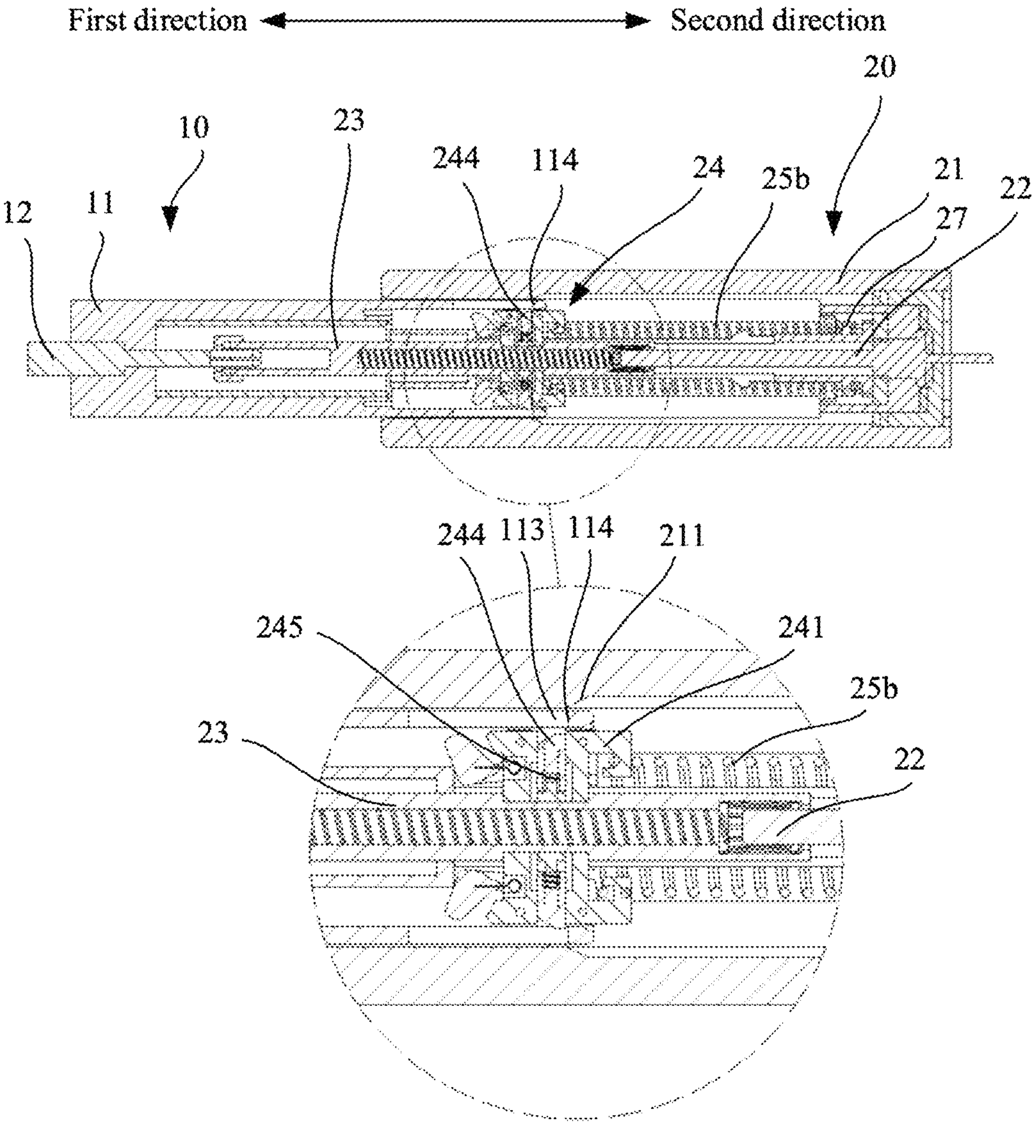
FIG. 17 is a schematic diagram of a cross-sectional structure of H-H in FIG. 16.

As shown in FIG. 16 and FIG. 17, in this case, under an action of a second trigger part 211, the second fastener 244 slides down to a second unlocking position shown in FIG. 17. In this case, the second spring 245 is compressed. After a downward acting force applied to the second fastener 244 disappears, the second spring 245 may be restored from the deformation, so that the second fastener 244 slides up to the second lock-up position shown in FIG. 15.

As shown in FIG. 4, the second fastener 244 has a triple structure, and a protrusion 246 located in the middle is clamped with a card slot 113 of the first housing 11, to lock the first housing 11 with the stopper 24. Two protrusions 247 and 248 located on two sides abut against the second trigger part 211 of the second housing 21. The second trigger part 211 is an oblique structure. When the second trigger part 211 abuts against the two protrusions 247 and 248, the second fastener 244 may be driven to move downward, so that the protrusion 246 is detached from the card slot 113, and the second fastener 244 is unfastened relative to the card slot 113.

It may be understood that, in another implementation, the second fastener 244 may also have another structure. For example, the second fastener 244 may also be disposed as a structure similar to that of the first fastener 242. Correspondingly, the first fastener 242 may also be disposed as a structure similar to that of the second fastener 244. This is not limited.

In addition, in another implementation, a corresponding structure may also be disposed on the base 27 to trigger the second fastener 244, so that the second fastener 244 is unfastened relative to the first housing 11, and the stopper 24 and the sliding terminal 23 may slide along the second direction.

As shown in FIG. 15, in this embodiment, the force accumulator further includes the second elastic component 25*b*. The second elastic component 25*b* may be a spiral spring. One end of the second elastic component 25*b* is connected to the base 27, and the other end is connected to the bracket 241. Under the action of the external force, when the second conductive terminal 22 moves relative to the sliding terminal 23 along the second direction, the second elastic component 25*b* is stretched and deformed. When there is no other constraint between the second conductive terminal 22 and the sliding terminal 23, the second elastic component 25*b* is restored from the deformation, so that the sliding terminal 23 slides relative to the second conductive terminal 22 along the second direction.

In this embodiment, the second elastic component 25*b* uses a spiral spring with a good tensile capability. When the second elastic component 25*b* is stretched under the action of the external force, the external force may be effectively absorbed and converted into an elastic force of the second elastic component 25*b*. Therefore, the second elastic component 25*b* may be effectively restored to a state before the second elastic component 25*b* is stretched, so that the elastic force can be effectively released to effectively pull the sliding terminal 23 to move.

It may be understood that, in another implementation, the second elastic component 25*b* may also be another elastic component that can absorb and release the force. Alternatively, the second elastic component 25*b* may not be disposed. In this case, the first elastic component 25*a* may replace the second elastic component 25*b*. One end of the first elastic component 25*a* needs to be fastened to a left end of the sliding slot 272. The other end needs to be fastened to the second conductive terminal 22. In addition, the second elastic component 25*b* may also be disposed at another position. In conclusion, under the action of the external force, when the second conductive terminal 22 moves relative to the sliding terminal 23 along the second direction, the second elastic component 25*b* may be deformed due to the accumulated force. When there is no constraint between the sliding terminal 23 (or the movable component) and the second conductive terminal 22 (or the fastening component), the second elastic component **25*b* can drive, through an elastic deformation of the second elastic component 25*b*, the sliding terminal 23** to move along the second direction.

To facilitate understanding of the solutions, the following describes different states of the first connector 10 and the second connector 20 when the first connector 10 and the second connector 20 are removed.

As shown in FIG. 14 and FIG. 15, in this case, the fastening component acts on the movable component and moves to a first separation position. Under the elastic force of the second spring 245, the second fastener 244 is located at the second lock-up position shown in FIG. 15, and abuts against a second abutting surface 114 of a card slot 113, to prevent the second fastener 244 (or the sliding terminal 23) from moving toward the second direction, the stopper 24 is fastened relative to the first housing 11. In addition, the second elastic component **25*b* is in a natural state, the second elastic component 25*b* is not extruded or stretched by the sliding terminal 23 and the second conductive terminal 22**.

As shown in FIG. 16 and FIG. 17, in this case, the fastening component moves to a second separation position, the second elastic component **25*b* is deformed due to the accumulated force, and the second trigger part 211 of the second housing 21 acts on the second fastener 244, so that the second fastener 244 slides down, and the second abutting surface 114 releases a limit on the second fastener 244. In addition, in this case, the sliding terminal 23 is connected with the first conductive terminal 12**.

Figure 18:
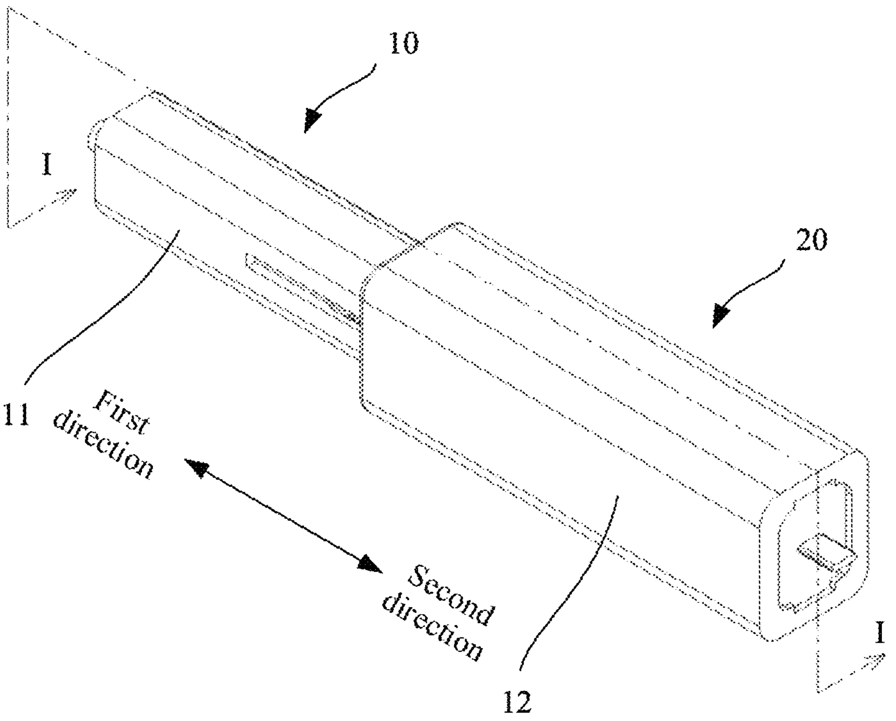
FIG. 18 is a schematic diagram of a three-dimensional structure of a connector component in another separation state according to an embodiment.
Figure 19:
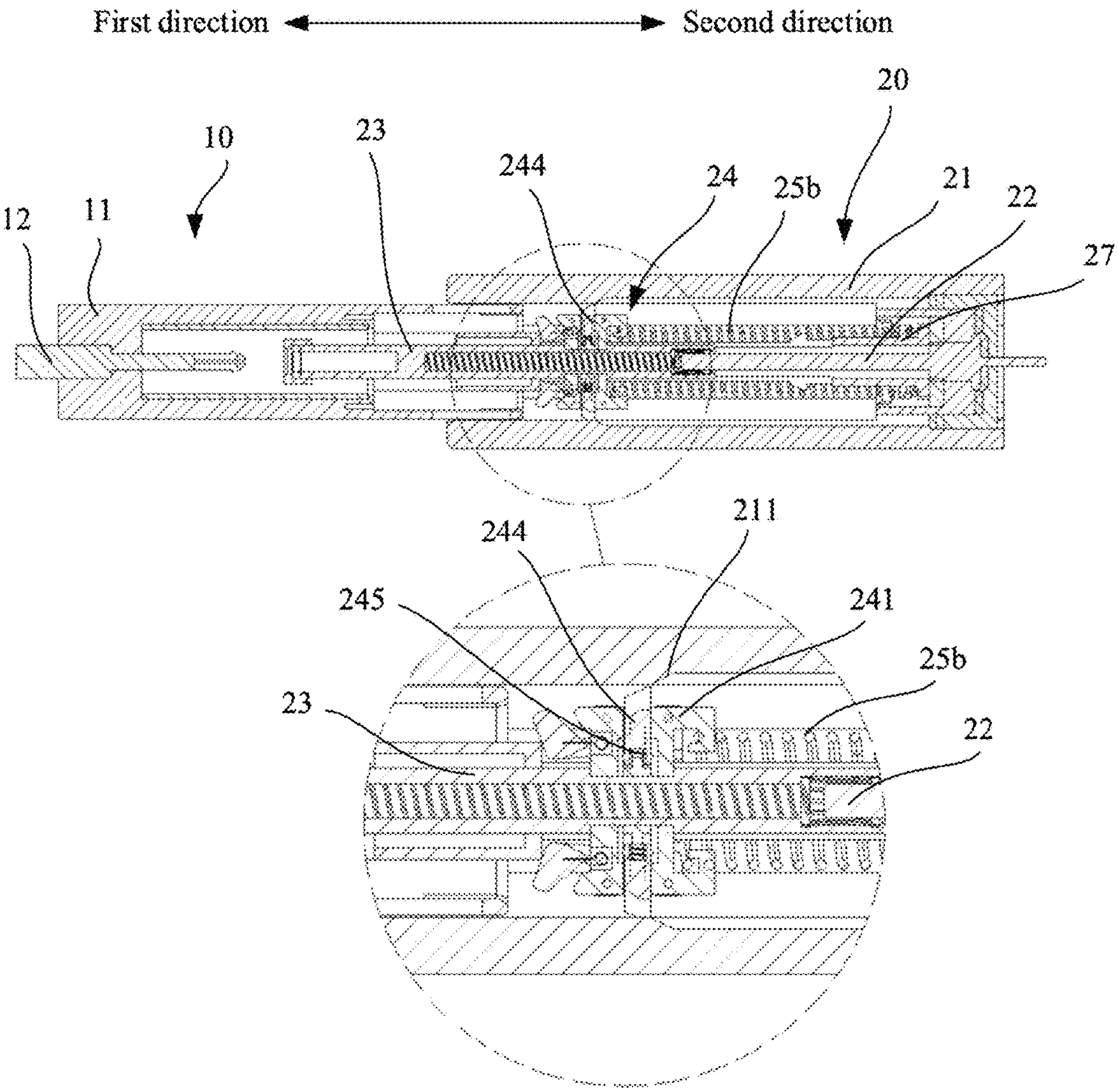
FIG. 19 is a schematic diagram of a cross-sectional structure of I-I in FIG. 18.

As shown in FIG. 18 and FIG. 19, in this case, the second elastic component **25*b* drives the movable component to move to a third separation position. Under the elastic force of the second elastic component 25*b*, the movable component quickly moves along the second direction, so that the sliding terminal 23 is separated from the second conductive terminal 22** at a high speed, to reduce the burning duration of the electric arc as much as possible.

In some implementations, to better separate the first connector 10 from the second connector 20, after the sliding terminal 23 is separated from the first conductive terminal 12 under an action of the second elastic component **25*b*, the second housing 21** may be further held by the hand to continuously move along the second direction.

In an application, the connector component may be applied to different types of circuits.

Figure 20:
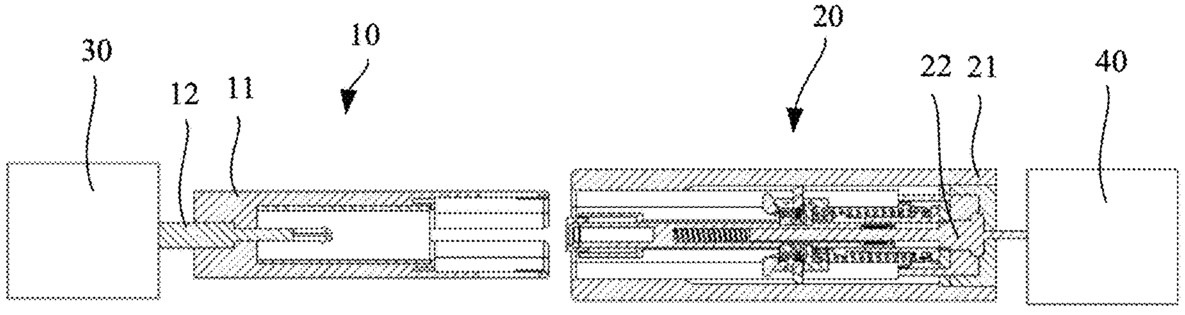
FIG. 20 is a schematic diagram of a structure of an electronic device according to an embodiment.

For example, as shown in FIG. 20, an embodiment may further provide an electronic device, including a first power-consuming device 30, a second power-consuming device 40, and any of the connector components. The first connector 10 is connected to the first power-consuming device 30, and the second connector 20 is connected to the second power-consuming device 40. One end (the left end in the figure) of the first conductive terminal 12 is electrically connected to a conductive structure of the first power-consuming device 30, and the other end (the right end in the figure) of the second conductive terminal 22 is electrically connected to a conductive structure of the second power-consuming device 40. When the first connector 10 is connected to the second connector 20, the first power-consuming device 30 may be connected to the second power-consuming device 40. When the first connector 10 is separated from the second connector 20, the first power-consuming device 30 may be disconnected from the second power-consuming device 40.

In an application, the first power-consuming device 30 may be a solid-state transformer, and the second power-consuming device 40 may be a power module. Types of the first power-consuming device 30 and the second power-consuming device 40 and an application scenario of the connector component are not limited.

The foregoing descriptions are merely implementations, but are not intended to limit the scope of the embodiments. Any variation or replacement readily figured out by a person skilled in the art shall fall within the scope of the embodiments.

What is claimed is:

1. A connector component, comprising a first connector comprising a first housing and a first conductive terminal fastened to the first housing; and a second connector comprising:

a fastening component comprising a second conductive terminal, and a movable component comprising:

a sliding terminal connected to the second conductive terminal in a sliding manner and a stopper fastened to the sliding terminal, the stopper comprising:

a bracket fastened to the sliding terminal;

a first fastener rotationally connected to the bracket; and a first spring connected to the first fastener and the bracket, wherein the first housing has a first abutting surface facing a second direction and the first spring is configured to rotate the first fastener to a position at which the first fastener abuts against the first abutting surface; and a force accumulator connected to the fastening component and the movable component, and, when the first connector is connected to the second connector and the stopper is fastened relative to the first housing, the fastening component and the movable component are configured to slide relative to each other, so that the force accumulator is deformed due to an accumulated force; and, when the stopper is unfastened relative to the first housing, the force accumulator is restored from the deformation and configured to drive the sliding terminal to be connected to the first conductive terminal; and when the first connector is separated from the second connector and; the stopper is fastened relative to the first housing, the fastening component and the movable component are configured to slide relative to each other, so that the force accumulator is deformed due to an accumulated force; and, when the stopper is unfastened relative to the first housing, the force accumulator is restored from the deformation and configured, to drive the sliding terminal to be separated from the first conductive terminal.

2. The connector component according to claim 1, wherein, in a process in which the second connector moves along a first direction and is connected to the second connector, the stopper is fastened relative to the first housing;

when the fastening component continues to move along the first direction, the force accumulator is deformed due to the accumulated force, and the fastening component acts on the stopper, so that the stopper is unfastened relative to the first housing; and when the force accumulator is restored from the deformation, the sliding terminal is connected to the first conductive terminal.

3. The connector component according to claim 2, wherein, in a process in which the second connector is separated from the second connector along the second direction, the stopper is fastened relative to the first housing;

when the fastening component continues to move along the second direction, the force accumulator is deformed due to the accumulated force, and the fastening component acts on the stopper, so that the stopper is unfastened relative to the first housing; and when the force accumulator is restored from the deformation, the sliding terminal is separated from the first conductive terminal; and the second direction is an opposite direction of the first direction.

4. The connector component according to claim 3, wherein the sliding terminal has a sliding slot facing the second direction; and a first one-end of the second conductive terminal facing the first direction is configured to be inserted into the sliding slot in a sliding manner.

5. The connector component according to claim 4, wherein the stopper further comprises a second fastener connected to the bracket in the sliding manner; and a second spring connected to the second fastener and the bracket, wherein the first housing has a second abutting surface facing the first direction and the second spring is configured to drive the second fastener to slide to a position at which the second fastener abuts against the second abutting surface.

6. The connector component according to claim 4, wherein the force accumulator further comprises:

a first elastic component located in the sliding slot, wherein a first end of the first elastic component is connected to a first end of the sliding slot and a second end is connected to the second conductive terminal, and, when the second conductive terminal moves relative to the sliding terminal along the first direction, the first elastic component is compressed and deformed.

7. The connector component according to claim 4, wherein the force accumulator further comprises a first elastic component located in the sliding slot, wherein a first end of the first elastic component is connected to a first end of the sliding slot, and a second end is connected to the second conductive terminal, and, when the second conductive terminal moves relative to the sliding terminal along the first direction, the first elastic component is compressed and deformed.

8. The connector component according to claim 3, wherein the fastening component further comprises:

a base having a sliding cylinder disposed in parallel to the first direction, wherein the sliding terminal is disposed in the sliding cylinder; and a second housing, wherein the base is fastened to the second housing, and the second conductive terminal is fastened to the second housing.

9. The connector component according to claim 3, wherein the stopper further comprises:

a second fastener connected to the bracket in the sliding manner; and a second spring connected to the second fastener and the bracket, wherein the first housing has a second abutting surface facing the first direction and the second spring is configured to drive the second fastener to slide to a position at which the second fastener abuts against the second abutting surface.

10. The connector component according to claim 9, wherein the second housing has a second trigger part, and when the second trigger part acts on the second fastener, the second trigger part is configured to drive the second fastener to a position at which the second fastener does not abut against the second abutting surface.

11. The connector component according to claim 3, wherein the first housing has a first groove opened toward the second direction and a first end of the first conductive terminal is located in the first groove.

12. The connector component according to claim 11, wherein a ceramic layer is disposed on a side wall of the first groove.

13. The connector component according to claim 2, wherein the second connector further comprises:

an elastic conductive member fastened to the sliding terminal and configured to elastically abut against the second conductive terminal.

14. The connector component according to claim 2, wherein the fastening component further comprises:

a base having a sliding cylinder disposed in parallel to the first direction, wherein the sliding terminal is disposed in the sliding cylinder; and a second housing, wherein the base is fastened to the second housing and, the second conductive terminal is fastened to the second housing.

15. The connector component according to claim 14, wherein the force accumulator further comprises:

a second elastic component, wherein a first end of the second elastic component is connected to the bracket, a second end of the second elastic component is connected to the base and, when the base moves relative to the bracket along the second direction, the second elastic component is stretched and deformed.

16. The connector component according to claim 14, wherein the second housing has a second groove opened toward the first direction; and a first end of the second conductive terminal is located in the second groove.

17. The connector component according to claim 1, wherein the second connector further comprises:

an elastic conductive member fastened to the sliding terminal and configured to elastically abut against the second conductive terminal.

18. The connector component according to claim 1, wherein the base has a first trigger part, and when the first trigger part acts on the first fastener, the first trigger part is configured to rotate the first fastener to a position at which the first fastener does not abut against the first abutting surface.

19. An electronic device, comprising a first power-consuming device; and a second power-consuming device, and a connector component, which comprises a first connector comprising a first housing and a first conductive terminal fastened to the first housing and electrically connected to the first power-consuming device, and a second connector comprising a fastening component comprising a second conductive terminal electrically connected to the second power-consuming device, a movable component comprising:

a sliding terminal connected to the second conductive terminal in a sliding manner and a stopper fastened to the sliding terminal, the stopper comprising:

a bracket fastened to the sliding terminal;

a first fastener rotationally connected to the bracket; and a first spring connected to the first fastener and the bracket, wherein the first housing has a first abutting surface facing a second direction and the first spring is configured to rotate the first fastener to a position at which the first fastener abuts against the first abutting surface; and a force accumulator connected to the fastening component and the movable component; and when the first connector is connected to the second connector and the stopper is fastened relative to the first housing, the fastening component and the movable component are configured to slide relative to each other, so that the force accumulator is deformed due to an accumulated force; and, when the stopper is unfastened relative to the first housing, the force accumulator is restored from the deformation and configured to drive the sliding terminal to be connected to the first conductive terminal; and when the first connector is separated from the second connector and the stopper is fastened relative to the first housing, the fastening component and the movable component are configured to slide relative to each other, so that the force accumulator is deformed due to an accumulated force; and, when the stopper is unfastened relative to the first housing, the force accumulator is restored from the deformation and configured, to drive the sliding terminal to be separated from the first conductive terminal.

* * * * *